(12) United States Patent
Aromin

(10) Patent No.: US 10,497,529 B2
(45) Date of Patent: Dec. 3, 2019

(54) UNIVERSAL GROUND FAULT CIRCUIT INTERRUPTER (GFCI) DEVICE AND PRINTED CIRCUIT BOARD PACKAGE

(71) Applicant: Victor V Aromin, West Warwick, RI (US)

(72) Inventor: Victor V Aromin, West Warwick, RI (US)

(73) Assignee: TOWER MFG CORP, Providence, RI (US)

( * ) Notice: Subject to any disclaimer, the term of this patent is extended or adjusted under 35 U.S.C. 154(b) by 366 days.

(21) Appl. No.: 15/582,649

(22) Filed: Apr. 29, 2017

(65) Prior Publication Data

US 2018/0315557 A1   Nov. 1, 2018

(51) Int. Cl.

| | |
|---|---|
| *H01H 83/04* | (2006.01) |
| *H01R 13/713* | (2006.01) |
| *H01H 83/14* | (2006.01) |
| *H01R 24/68* | (2011.01) |
| *H01R 25/00* | (2006.01) |
| *H01R 31/06* | (2006.01) |
| *H02H 3/33* | (2006.01) |

(52) U.S. Cl.
CPC ......... *H01H 83/04* (2013.01); *H01R 13/7135* (2013.01); *H01H 83/144* (2013.01); *H01H 2083/045* (2013.01); *H01R 24/68* (2013.01); *H01R 25/006* (2013.01); *H01R 31/065* (2013.01); *H02H 3/334* (2013.01)

(58) Field of Classification Search
CPC ...... H01H 9/54; H01H 71/2463; H01H 83/04; H01H 83/144; H01H 2083/045; H01R 13/7135; H01R 24/68; H01R 25/006; H01R 31/065; H02H 3/331; H02H 3/335
USPC .......................................................... 361/42
See application file for complete search history.

(56) References Cited

U.S. PATENT DOCUMENTS

| | | | |
|---|---|---|---|
| 2008/0094764 A1* | 4/2008 | Zhang .................. | H01R 13/665 361/42 |
| 2012/0052702 A1* | 3/2012 | Zou ..................... | H01R 13/7135 439/95 |
| 2013/0100560 A1* | 4/2013 | Zou ..................... | H01R 13/7135 361/42 |

* cited by examiner

*Primary Examiner* — Kevin J Comber

(57) ABSTRACT

A universal ground fault circuit interrupter (GFCI) device for interrupting the flow of current through a pair of lines extending between a source of power and a load. The GFCI device is easily adaptable to fit into a plurality of enclosure types and includes a top surface having a stationary assembly. The stationary assembly includes a load section a GFCI circuit section, and a power source section, wherein the components of the device are arranged to minimize space, maintain arcing and dielectric prevention distances, and allow for peripheral load and source connections facilitating easy adaptability into a variety of GFCI enclosures.

14 Claims, 29 Drawing Sheets

UNIVERSAL GROUND FAULT CIRCUIT INTERRUPTER (GFCI) DEVICE AND PRINTED CIRCUIT BOARD PACKAGE

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. utility patent application, Ser. No. 14/030,944 entitled "A Universal Ground Fault Circuit Interruptor (GFCI) Device and Printed Circuit Board Package", naming Victor V. Aromin and Chepur P. Rau as inventors, filed 18 Sep. 2013.

BACKGROUND

1. Field of Use

The present invention relates generally to electrical safety devices and more particularly to Ground Fault Circuit Interrupters (GFCI) and GFCI printed circuit board (PCB) layout and packaging.

2. Description of Prior Art

Conventional electrical appliances typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

The connection of an electrical appliance to a power supply by a pair of conducting lines creates a number of potentially dangerous conditions. In particular, there exists the risk of ground fault and grounded neutral conditions in the conducting lines. A ground fault condition occurs when there is an imbalance between the currents flowing in the line and neutral conductors. A grounded neutral condition occurs when the neutral conductor is grounded at the load. Both ground fault and grounded neutral conditions are extremely dangerous and can result in serious injury.

Ground fault circuit interrupters are well known in the art and are commonly used to protect against ground fault and grounded neutral conditions. In general, GFCI devices sense the presence of ground fault and grounded neutral conditions in the conducting lines, and in response thereto, open at least one of the conducting lines between the power supply and the load to eliminate the dangerous condition.

In U.S. Pat. No. 5,177,657, to M. Baer et al, there is disclosed a ground fault interrupter circuit which interrupts the flow of current to a pair of lines extending between a source of power and a load. The ground fault interrupter circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state. The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch to latch in its second state upon detection of the fault condition.

In U.S. Pat. No. 5,418,678 to T. M. McDonald, there is disclosed an improved ground fault circuit interrupter (GFCI) device which requires manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

In U.S. Pat. No. 4,816,957 to L. F. Irwin there is disclosed an adapter unit comprising a moisture resistant housing within which is carried an improved, self testing ground line fault interrupter device. The improved device is electrically interconnected with a connector carried externally of the adapter housing so that the unit can be plugged directly into a standard duplex outlet of an existing circuit. The apparatus includes circuitry that automatically tests the operability of the device when it is plugged into a duplex outlet without the need for manual manipulation of test buttons or other overt action by the user.

In U.S. Pat. No. 4,578,732 to C. W. Draper et al there is disclosed a wall socket type ground fault circuit interrupter having a pair of sockets, a reset button and a test button that are accessible from the front of the interrupter. The interrupter has latched snap-acting contacts and a novel latching relay structure for releasably maintaining the snap-acting contacts in a circuit making position. The snap-acting contacts permit all of the components including the monitoring toroids and the power supply to be respectively located and connected at the load side of the snap-acting contacts so that all of the circuits of the interrupter are de-energized when the contacts snap to a circuit opening position. The snap-acting contact mechanism and relay are provided with structures which provide the interrupter with a trip-free mode of contact actuation and accordingly a tease-proof snap-acting contact operation.

A drawback of GFCI devices of the type described above is that the GFCI device generally includes a large solenoid to selectively open and close the switching device. Specifically, the solenoid generally requires a constant supply of line voltage (approximately 120 volts) in order to switch and sustain the solenoid in its energized state. As a consequence, the solenoid acts as a large power drain source. In addition, the constant supply of line voltage to the solenoid causes the solenoid to heat significantly and which can substantially shorten its useful life.

Other drawbacks of GFCI devices of the type described above are that the GFCI device generally includes multiple PCBs requiring bulky housings to encapsulate the multiple PCBs. Thus, there is a necessity to separate the connections of dissimilar polarities by a large enough distance to meet the surface tracking distances within a GFCI circuit as given by standards such as UL840; but, also concurrently package the GFCI circuitry to minimize the overall packaging profile.

Still more drawbacks of GFCI devices of the type described above are that the GFCI devices generally require unique configured PCBs for each type of GFCI enclosure, e.g., a right angle GFCI requires differently configured PCBs than does an in-line GFCI enclosure. Consequently, each type of GFCI PCB requires a separate production line leading to increased time to build and cost. Thus there exists a need for a universal GFCI PCB adaptable to connect to a variety of power source and load input connections including 3-prong plug assemblies and hard wired terminals. These connections are most often embodied within various dimensioned GFCI enclosures such that the GFCI of the present invention can be utilized in a variety of configurations.

BRIEF SUMMARY

The foregoing and other problems are overcome, and other advantages are realized, in accordance with the presently preferred embodiments of these teachings. In accordance with one embodiment the invention is directed towards a single universal GFCI PCB adaptable to fit within either an inline GFCI enclosure, a right angle GFCI enclosure, or any suitable GFCI enclosure. Components and circuit traces mounted and or adhered to the universal GFCI PCB are configured to minimize PCB packaging density while simultaneously maximizing distances between component and circuit traces to conform to required safety standards, e.g., UL840, to prevent electric arcing and dielectric breakdown.

The invention is also directed towards a universal ground fault circuit interrupter (GFCI) printed circuit board (PCB) for interrupting the flow of current through a pair of lines extending between a source of power and a load. The GFCI PCB is easily adaptable to fit into a plurality of enclosure types as herein described including enclosures having a plurality of load inputs operating off a single GFCI PCB. In the preferred embodiment, the GFCI PCB includes a GFCI PCB substantially 2.75 inches by 1.5 inches and includes a top surface having a stationary assembly. The stationary assembly includes a load section 100, a GFCI circuit section 105, and a power source section 110, wherein the sections are adapted to minimize space, maintain arcing and dielectric prevention distances, and allow for peripheral load and source connections facilitating easy adaptability into a variety of GFCI enclosures.

The universal GFCI PCB also includes a plurality of spaced resistors, wherein the plurality of spaced resistors are adapted to minimize space while maintaining arcing and dielectric prevention distances. Similarly, the universal GFCI PCB also includes a plurality of spaced capacitors, wherein the plurality of spaced capacitors are adapted to minimize space while maintaining arcing and dielectric prevention distances. The universal GFCI PCB also includes a bottom surface having a plurality of spaced components wherein the plurality of spaced components are adapted to minimize space while maintaining arcing and dielectric prevention distances; and a plurality of traces, wherein the plurality of traces are adapted to minimize space while maintaining arcing and dielectric prevention distances.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
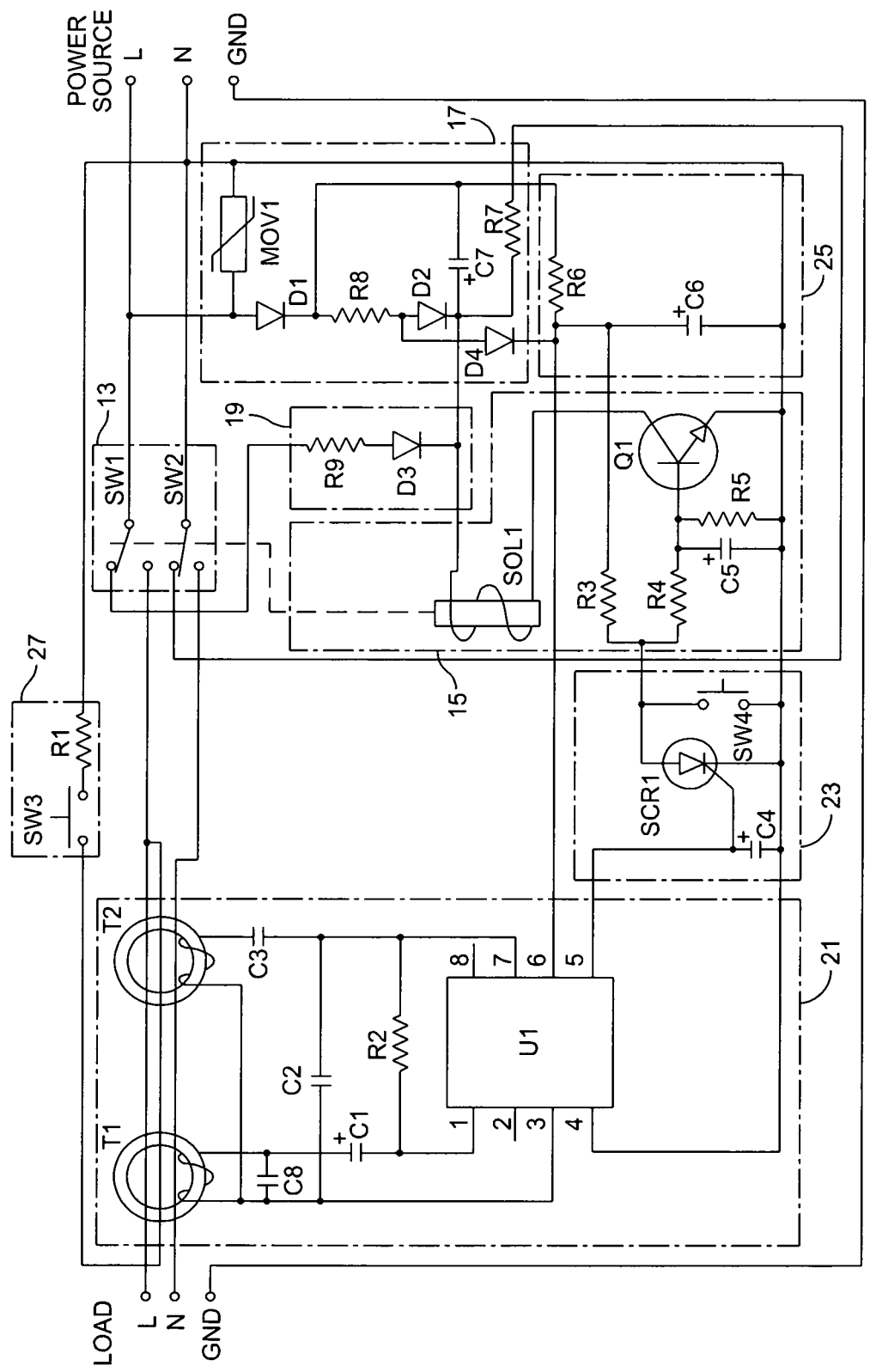
FIGS. 1-8 are prior art schematic circuit diagrams of a Ground Fault Circuit Interrupters (GFCIs) that are incorporated into the structural embodiments of subject invention as illustrated in FIGS. 9 through 26.

Referring now to the drawings and more particularly to FIG. 1, there is shown a ground fault circuit interrupter (hereinafter GFCI) constructed according to the teachings of the present invention, the GFCI being represented generally by reference numeral 11. As will be discussed in detail below, GFCI 11 is automatically set to protect a load from ground fault conditions upon the initial plugging in of the load to a power source. GFCI 11 is also automatically set to protect the load from ground fault conditions once power is restored to the power source after a loss of power. Furthermore, once GFCI 11 protects the load from a ground fault condition, GFCI 11 can be manually reset to protect against further ground fault conditions.

GFCI 11 includes a circuit breaker 13, a relay circuit 15, a power supply circuit 17, a booster circuit 19, a fault detection circuit 21, a bi-stable electronic latch circuit 23, a filter circuit 25 and a test circuit 27. Circuit breaker 13 includes a pair of single-pole, double-throw switches SW1 and SW2 which are located in the line and neutral conductive lines, respectively, between a power source and a load. Circuit breaker 13 acts to selectively open and close the pair of conductive lines. Switches SW1 and SW2 can be positioned in either of two connective positions. In the first connective position, which is illustrated in FIG. 1, switches SW1 and SW2 are positioned such that the power source is not connected to the load but is connected to booster circuit 19. In the second connective position, which is the opposite position illustrated in FIG. 1, switches SW1 and SW2 are positioned such that the power source is connected to the load but not to booster circuit 19. In both positions, the power source is connected to power supply 17.

Relay circuit 15 acts to selectively position switches SW1 and SW2 in either its first connective position or its second connective position. Relay circuit 15 comprises a solenoid SOL1, a transistor Q1, a load resistor R3, a pair of voltage divider resistors R4 and R5, and noise suppression capacitor C5.

Solenoid SOL1 is ganged to the circuit breaker contacts of switches SW1 and SW2 and is responsible for selectively controlling the connective position of switches SW1 and SW2. Before power is applied to GFCI 11, solenoid SOL1 positions switches SW1 and SW2 in their first connective position. After power is applied to GFCI 11, switches SW1 and SW2 will remain in their first connective position. When solenoid SOL1 is energized, solenoid SOL1 positions switches SW1 and SW2 in their second connective position. It should be noted that the particular construction of solenoid SOL1 is unique for conventional GFCI devices. In particular, SOL1 is significantly small in size and requires less power than most solenoids used in prior art GFCI devices. Specifically, solenoid SOL1 has a coil resistance of substantially 2400 ohms. As a result of the unique construction of solenoid SOL1, line voltage (approximately 120 volts) must be directly supplied to solenoid SOL1 in order to initially energize solenoid SOL1 from its de-energized state. But more importantly, once energized, a constant voltage of only approximately 28 volts is required to be supplied to solenoid SOL1 in order to keep it in its energized state.

As will be discussed in detail below, booster circuit 19 is responsible for providing the line voltage to initially energize solenoid SOL1 from its de-energized state and power supply circuit 17 is responsible for supplying the constant voltage of approximately 28 volts to maintain solenoid SOL1 in its energized state. The reduction in the voltage required to maintain solenoid SOL1 in its energized state (approximately 92 volts) significantly reduces the power drain of SOL1 in circuit 11 and also reduces heat build-up which could cause solenoid SOL1 to burn out.

Transistor Q1 is may be any suitable transistor such as, for example, an MPSA42 transistor sold by Motorola Corporation and acts to control the current supplied to energize solenoid SOL1. When transistor Q1 is off, current cannot flow through solenoid SOL1. On the other hand, when transistor Q1 is on, current can flow through solenoid SOL1. Load resistor R3 has a value of 4.7 K ohms and acts to control a rectifier (to be described in detail below) in latch circuit 23. Voltage divider resistors R4 and P5 each have a value of 22 K ohms and together act to provide the necessary base current to enable transistor Q1 to turn on. Noise suppression capacitor C5 has a value of 0.1 uF and acts to filter out noise in GFCI 11.

Power supply circuit 17 acts to provide power for GFCI circuit 11. Power supply circuit 17 comprises a metal oxide varistor MOV1, a silicon rectifier D1, a voltage dropping resistor R8, a filter capacitor C7, a bleeder resistor R7, a silicon rectifier D2 and a silicon rectifier D4. Varistor MOV1 has a value of 150 volts and acts to protect against a voltage surge from the AC power source. Silicon rectifier D1 may be any suitable device such as an IN4005 and acts to convert the AC current in the line from the power source into a DC current. Voltage dropping resistor R8 has a value of 5.1 K ohms and acts to limit the constant input voltage supplied to solenoid SOL1 for the reasons noted above. Specifically, resistor R8 drops the line voltage in the line to approximately 28 volts before it is directly supplied to solenoid SOL1. Filter capacitor C7 has a value of 22 uF and acts to filter the constant voltage supplied to solenoid SOL1. Bleeder resistor R7 has a value of 100 K ohms and acts to bleed the charge of capacitor C7 when the load is unplugged from the power source. Silicon rectifier D2 may be any suitable device such as a IN4005 and acts to prevent the DC voltage surge provided by booster circuit 19 (which will be discussed in detail below) from entering into in other parts of GFCI 11. Silicon rectifier D4 is preferably an IN4005 and acts as a voltage regulator for solenoid SOL1 and also acts to speed up the charge in filter circuit 25 for quick filtering.

Booster circuit 19 acts to provide a temporary voltage sufficient to initially energize solenoid SOL1 from its de-energized state. Booster circuit 19 comprises a silicon rectifier D3 and a surge limit resistor R9. Rectifier D3 is preferably an IN4005 and acts to convert the AC power in the line of the power source to DC power. When switch SW1 is in its first position and upon the application of power to GFCI 11, rectifier D3 provides an instant DC voltage to solenoid SOL1 causing solenoid SOL1 to energize which, in turn, causes solenoid SOL1 to move switches SW1 and SW2 to their second connective position. When switches SW1 and SW2 are moved to their second connective position, booster circuit 19 is disconnected from the power source. Resistor R9 has a value of 47 ohms and acts to protect rectifier D3 and capacitor C7 from over-currents.

Fault detection circuit 21 acts to detect both ground fault and grounded neutral conditions in the conductive lines when switches SW1 and SW2 are in their second connective position. Fault detection circuit 21 comprises a sense transformer T1, a grounded neutral transformer T2, a coupling capacitor C1, a pair of noise suppression capacitors C2 and C8, a feedback resistor R2 and a ground fault interrupter chip U1. Transformer T1 may be any suitable transformer such as, for example, C-5029-01-00 transformer sold by Magnetic Metals; and, transformer T2 may be any suitable transformer such as, for example, F-3006-01 transformer sold by Magnetic Metals. Sense transformer T1 senses the current differential between the line and neutral conductive lines, and upon the presence of a ground fault condition, transformer T1 induces an associated output from its secondary windings. Grounded neutral transformer T2 acts in conjunction with transformer T1 to sense the presence of grounded neutral conditions and, in turn, induce an associated output. Coupling capacitor C1 has a value of 47 uF and acts to couple the AC signal from the secondary winding of transformer T1 to chip U1.

Noise suppression capacitor C2 has a value of 4700 pF and noise suppression capacitor C8 has a value of 1000 pF. Together capacitors C2 and C8 act to prevent fault detection circuit 21 from operating in response to line disturbances such as electrical noise and lower level faults. Tuning capacitor C3 has a value of 0.033 uF and feedback resistor has a value of 909 K ohms. Together capacitor C3 and resistor R2 act to set the minimum fault current at which fault detection circuit 21 provides an output signal to latch circuit 23. Interrupter chip U1 may be any suitable interrupter chip such as, for example, RV4145 low power ground fault interrupter circuit sold by Raytheon Corporation. Chip U1 serves to amplify the fault signal generated by transformer T1 and provide an output pulse on pin 5 to activate latch circuit 23.

Latch circuit 23 acts to take the electrical signal produced by fault detection circuit 21 upon the detection of a ground fault or grounded neutral condition and, in turn, de-energize solenoid SOL1. Latch circuit 23 comprises a silicon controlled rectifier SCR1 operable in either a conductive or a non-conductive state, a noise suppression capacitor C4 and a reset switch SW4. Rectifier SCR1 may be any suitable rectifier such as, for example, an EC103A rectifier sold by Teccor Corporation and acts to selectively turn on and off transistor Q1 in relay circuit 15. Noise suppression capacitor C4 has a value of 2.2 uF and acts in preventing rectifier SCR1, when in its nonconductive state, from firing as a result of electrical noise in circuit 11. Reset switch SW4 is a conventional push-in type switch and acts when depressed to remove holding current from the anode of rectifier SCR1, causing rectifier SCR1 to turn off when it is in its conductive state.

Filter circuit 25 acts to smooth out the varying DC voltage provided from the power supply and provide a filtered DC voltage to the power input of chip U1. Filter circuit 25 includes a voltage dropping resistor R6 which preferably has a value of 18 K ohms and acts to regulate the appropriate voltage supplied to chip U1. Filter circuit 25 also includes a DC filter capacitor C6 which preferably has a value of 3.3 uF and acts to filter the ripple of the voltage supplied to chip U1.

Test circuit 27 provides a means of testing whether circuit 11 is functioning properly. Test circuit 27 comprises a current limiting resistor R1 having a value of 15 K ohms and a test switch SW3 of conventional push-in type design. When SW3 is depressed to energize test circuit 27, resistor R1 provides a simulated fault current to transformer T1 which is similar to a ground fault condition.

In use, GFCI 11 functions in the following manner. Prior to initial connection, switches SW1 and SW2 are normally in their first connective position as shown in FIG. 1. Upon initial connection of GFCI 11 at one end to the load and at the other end to the power source, line voltage of approximately 120 volts is applied to solenoid SOL1 through booster circuit 19 and energizes solenoid SOL1. Once solenoid SOL1 is energized, solenoid SOL1 causes switches SW1 and SW2 to move into their second connective position (opposite the position shown in FIG. 1), thereby eliminating the supply of power into solenoid SOL1 from booster circuit 19. However, since a constant 28 volts is supplied to solenoid SOL1 from power supply circuit 17, solenoid SOL1 is maintained in its energized state.

With solenoid SOL1 maintained in its energized state, rectifier SCR1 is in a non-conductive state and transistor Q1 is on, which enables current to pass to solenoid SOL1. Upon the detection of a ground fault or grounded neutral condition, fault detection circuit 21 sends a current to rectifier SCR1 causing rectifier SCR1 to be in a conductive state which, in turn, turns off transistor Q1. With transistor Q1 off, current does not pass to solenoid SOL1 and therefore solenoid SOL1 becomes de-energized. Once de-energized, solenoid SOL1 causes switches SW1 and SW2 to return to its first connective position, thereby cutting off power from the power source to the load.

Once the fault condition is removed, circuit 11 can be reset by manually depressing switch SW4. Depression of switch SW4 causes current to pass through reset switch SW4 instead of rectifier SCR1, which turns off rectifier SCR1. This, in turn, turns transistor Q1 back on which enables solenoid SOL1 to become re-energized. With the load plugged into the power source, if there is a loss of power at the power source, solenoid SOL1 will become de-energized, moving switches SW1 and SW2 back to their first connective position. When power is subsequently restored, solenoid SOL1 will become re-energized again, which causes switches SW1 and SW2 to move to their second position.

Figure 2:
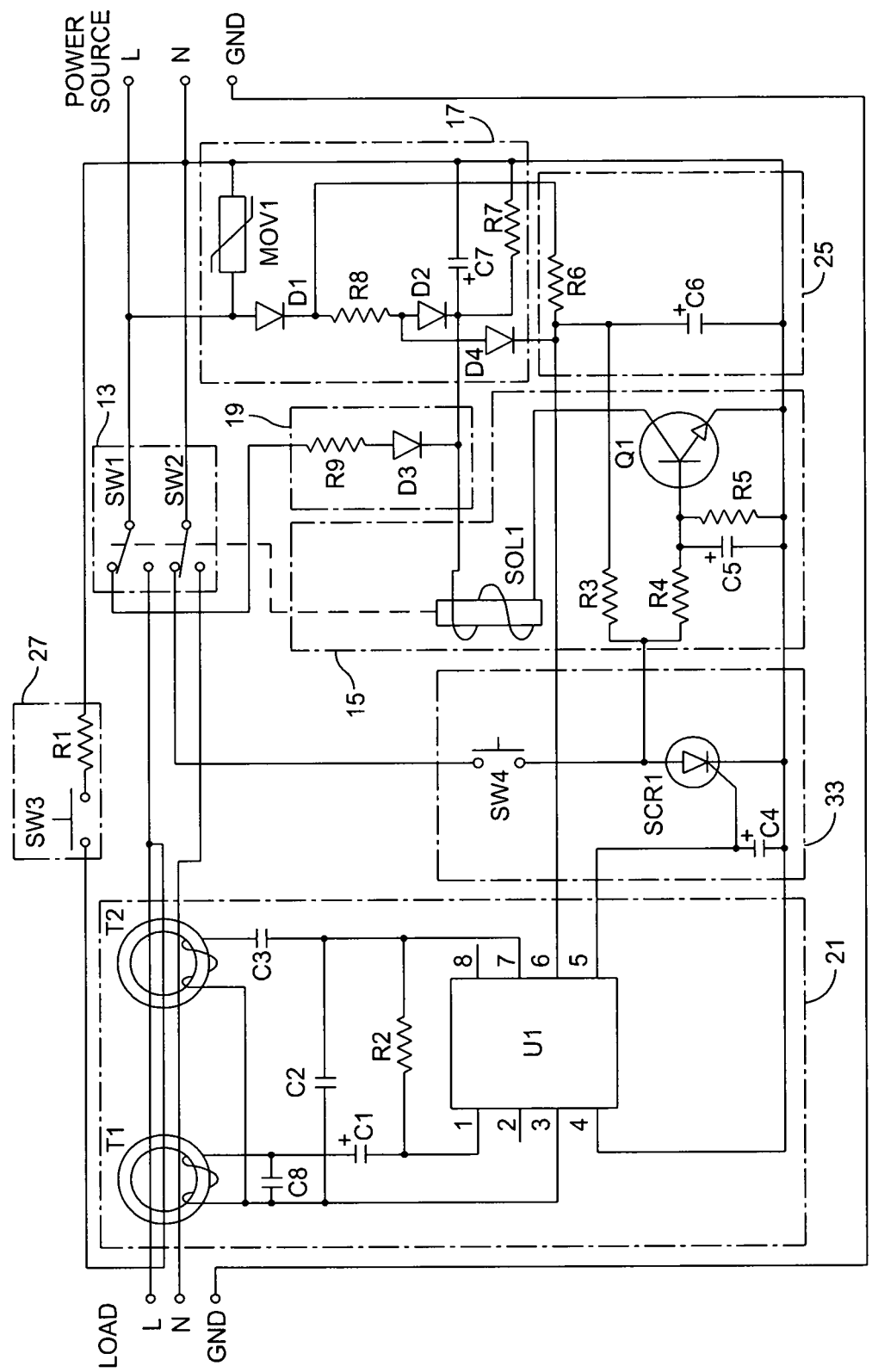

FIG. 2 shows another ground fault circuit interrupter (GFCI) constructed according to the teachings of the present invention, the GFCI being represented generally by reference numeral 31. GFCI 31 is automatically set to protect a load from ground fault conditions upon the initial plugging in of the load to a power source. GFCI 31 is also automatically set to protect the load from ground fault conditions once power is restored to the power source after a loss of power. Furthermore, once GFCI 31 protects the load from a ground fault condition, GFCI 31 can be manually reset to protect against further ground fault conditions.

GFCI 31 is similar in construction to GFCI 11, with the exception being the connection of the reset switch SW4 and the connection of bleeder resistor R7. In latch circuit 23 of GFCI 11, reset switch SW4 is connected in parallel with rectifier SCR1 across its anode to its cathode. To the contrary, in latch circuit 33 of GFCI 31, reset switch SW4 is connected in series with rectifier SCR1, one end of switch SW4 being connected to the anode of rectifier SCR1 and the other end being connected to switch SW2. In GFCI 11, bleeder resistor R7 is connected to the positive terminal of filter capacitor C7 and switch SW2. To the contrary, in GFCI 31, bleeder resistor R7 is connected to the positive terminal of filter capacitor C7 and the neutral conductive line.

In use, GFCI 31 functions in a similar manner to GFCI 11. In both GFCI 11 and GFCI S 31, if a ground fault condition is detected by the fault detection circuit, silicon controlled rectifier SCR1 turns on, which turns off transistor Q1 which, in turn, de-energizes solenoid SOL1. However, if the ground fault condition remains in the pair of conductive lines and continues to be detected by fault detection circuit 21, GFCI 11 and GFCI 31 function differently. Specifically, if reset switch SW4 in GFCI 11 is depressed while in this condition, rectifier SCR1 will be turned off for so long as switch SW4 is depressed. This causes transistor Q1 to temporarily turn on which, in turn, energizes solenoid SOL1 while the ground fault condition still exits in the pair of conductive lines. This results in a potentially dangerous situation for the user.

To the contrary, if reset switch SW4 in GFCI 31 is depressed while in this condition, rectifier SCR1 will remain turned on for as long as the condition remains, regardless of whether switch SW4 is depressed. This prevents solenoid SOL1 from ever becoming re-energized while the ground fault condition remains in the conductive lines, thereby eliminating the potentially dangerous situation.

Figure 3:
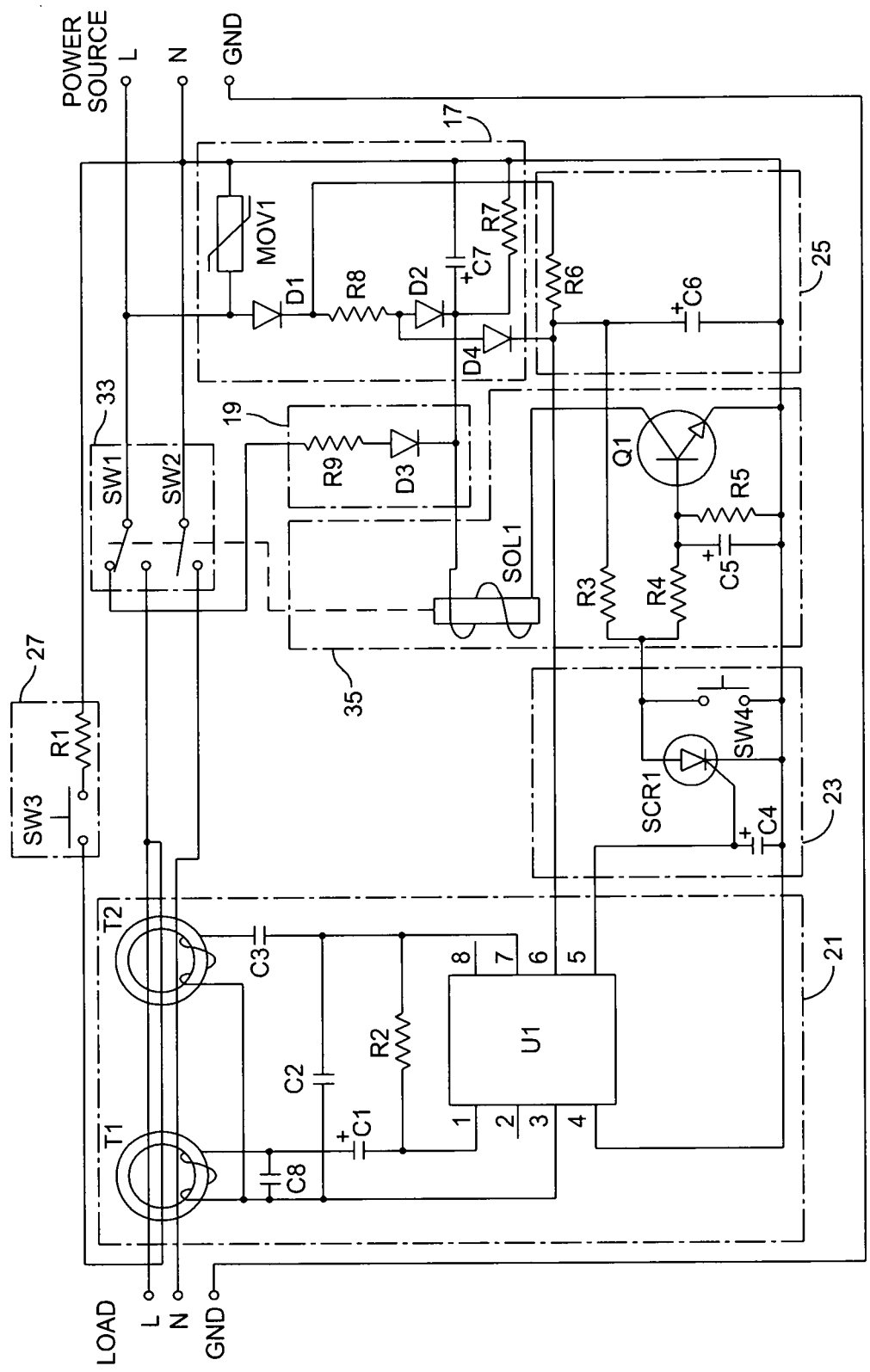

FIG. 3 shows another ground fault circuit interrupter (GFCI) constructed according to the teachings of the present invention, the GFCI being represented generally by reference numeral 41. GFCI 41 is automatically set to protect a load from ground fault conditions upon the initial plugging in of the load to a power source. GFCI 41 is also automatically set to protect the load from ground fault conditions once power is restored to the power source after a loss of power. Furthermore, once GFCI 41 protects the load from a ground fault condition, GFCI 41 can be manually reset to protect against further ground fault conditions. GFCI 41 includes a circuit breaker 33, a relay circuit 35, a power supply circuit 17, a booster circuit 19, a fault detection circuit 21, a latch circuit 23, a filter circuit 25 and a test circuit 27. GFCI 41 differs from GFCI 11 only in the type of one switch used in the circuit breaker and in the value of the capacitor in the relay circuit.

Specifically, in GFCI 41, circuit breaker 33 includes a single-pole, double-throw switch SW1 and a normally open single-pole, single-throw switch SW21. When switch SW21 is open, as illustrated in FIG. 3, the neutral conductive line from the power source is not connected to the load. Whereas, when switch SW21 is closed, the neutral conductive line from the power source is connected to the load. To the contrary, in circuit breaker 13 in GFCI 11 both switches SW1 and SW2 are single-pole, single-throw switches. Additionally, noise suppression capacitor C15 in relay circuit 35 of GFCI 41 has a value of 1 uF whereas capacitor C5 in relay circuit 19 has a value of 0.1 uF.

Figure 4:
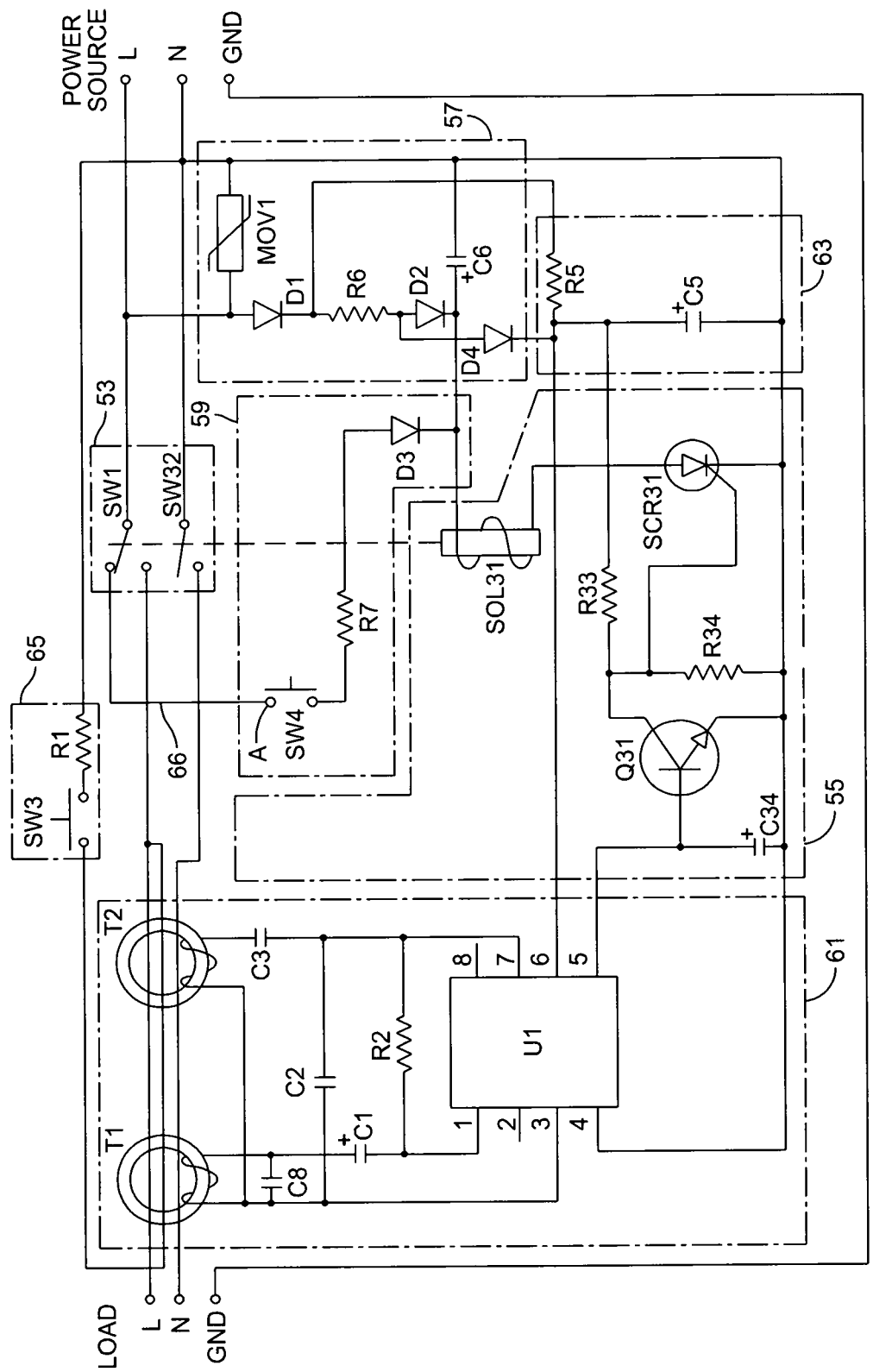

FIG. 4 shows another ground fault circuit interrupter (GFCI) constructed according to the teachings of the present invention, the GFCI being represented generally by reference numeral 51. As will be discussed in detail below, GFCI 51 requires manual depression of a reset switch in order to protect a load from ground fault conditions upon the initial plugging in of the load to a power source. GFCI 51 also requires manual depression of a reset switch in order to protect the load from ground fault conditions once power is restored to the power source after a loss of power. Furthermore, once GFCI 51 protects the load from a ground fault condition, GFCI 51 requires a manual reset to protect against further ground fault conditions.

GFCI 51 comprises a circuit breaker 53, a relay circuit 55, a power supply circuit 57, a booster circuit 59, a fault detection circuit 61, a filter circuit 63 and a test circuit 65. Fault detection circuit 61, filter circuit 63 and test circuit 65 are identical in construction and function to fault detection circuit 21, filter circuit 25 and test circuit 27, respectively.

Circuit breaker 53 differs from circuit breaker 13 only in that switch SW32 of circuit breaker 53 is a normally open single-pole, single-throw switch whereas switch SW2 in GFCI 11 is a single-pole, double-throw switch. Switch SW32 is positionable in either of two positions, namely, a first position in which it is open, as illustrated in FIG. 4, such that the AC power from the power source is disconnected to the load and a second position in which it is closed, such that the AC power from the power source is connected to the load. Relay circuit 55 resembles a hybrid of relay circuit 15 and latch circuit 23 of GFCI 11. Specifically, relay circuit 55 comprises a solenoid SOL31, a transistor Q31, a silicon controlled rectifier SCR31, a load resistor R33, a bias resistor R34 and a noise suppression capacitor C34.

Solenoid SOL31 is identical in construction and function to solenoid SOL1. Transistor Q31 may be any suitable device such as a 2N2222 transistor and acts to control the current supplied to rectifier SCR31. Rectifier 31 may be any suitable device such as a EC103D rectifier manufactured by Teccor and acts in controlling whether current is supplied to solenoid SOL31. Load resistor R33 is preferably 39 K ohms and acts to provide collector voltage to transistor Q31. Bias resistor R34 is preferably 10 K ohms and acts, in association with resistor R3, to bias gate current to rectifier SCR31. Noise suppression capacitor C34 is preferably 2.2 uF and acts to prevent transistor Q31 from conducting as a result of electrical noise in the circuit.

Power supply circuit 57 is identical to power supply circuit 17 with the exception being that circuit 57 does not include the bleeder resistor R7 present in circuit 17. Booster circuit 59 is identical to booster circuit 19 with the sole exception being that in circuit 51, reset switch SW4 is located in booster circuit 59, whereas in circuit 11 reset switch SW4 is located in latch circuit 23. The relocation of reset switch SW4 in booster circuit 59 enables circuit 51 to function as a manually operable GFCI device, as will be described in detail below.

In use, GFCI 51 functions in the following manner. Prior to initial connection, switches SW1 and SW32 are normally in their first connective position as shown in FIG. 1. Upon initial connection of GFCI 51 at one end to the load and at the other end to the power source, switches SW1 and SW32 remain in their first position. With switches SW1 and SW32 in their first position, as shown in FIG. 4, switch SW1 is connected to terminal A in switch SW4 through line 66. When reset switch SW4 is depressed, line voltage passes through booster circuit 59 into solenoid SOL31, the line voltage of approximately 120 volts energizing the solenoid. Once solenoid SOL31 is energized, solenoid SOL31 causes switches SW31 and SW32 to move into their second connective position (opposite the position shown in FIG. 4), thereby eliminating the supply of power into solenoid SOL31 from booster circuit 59. However, since line voltage is converted into 28 volts by power supply circuit 57 and is constantly supplied to solenoid SOL31, solenoid SOL31 is maintained in its energized state.

With solenoid SOL31 maintained in its energized state, rectifier SCR31 is in a conductive state and transistor Q31 is off, which enables current to pass to solenoid SOL31. Upon the detection of a ground fault or grounded neutral condition, fault detection circuit 61 sends current to transistor Q31 which turns transistor Q31 on and, in turn, turns off rectifier SCR31. With rectifier SCR31 off, current does not pass into solenoid SOL31, causing solenoid SOL31 to become de-energized. Once de-energized, solenoid SOL31 causes switches SW1 and SW32 to return to their first position, thereby cutting off the supply of power from the power source to the load. Once the fault condition is removed, circuit 51 can be reset by depressing reset switch SW34 and the cycle repeats.

Figure 5:
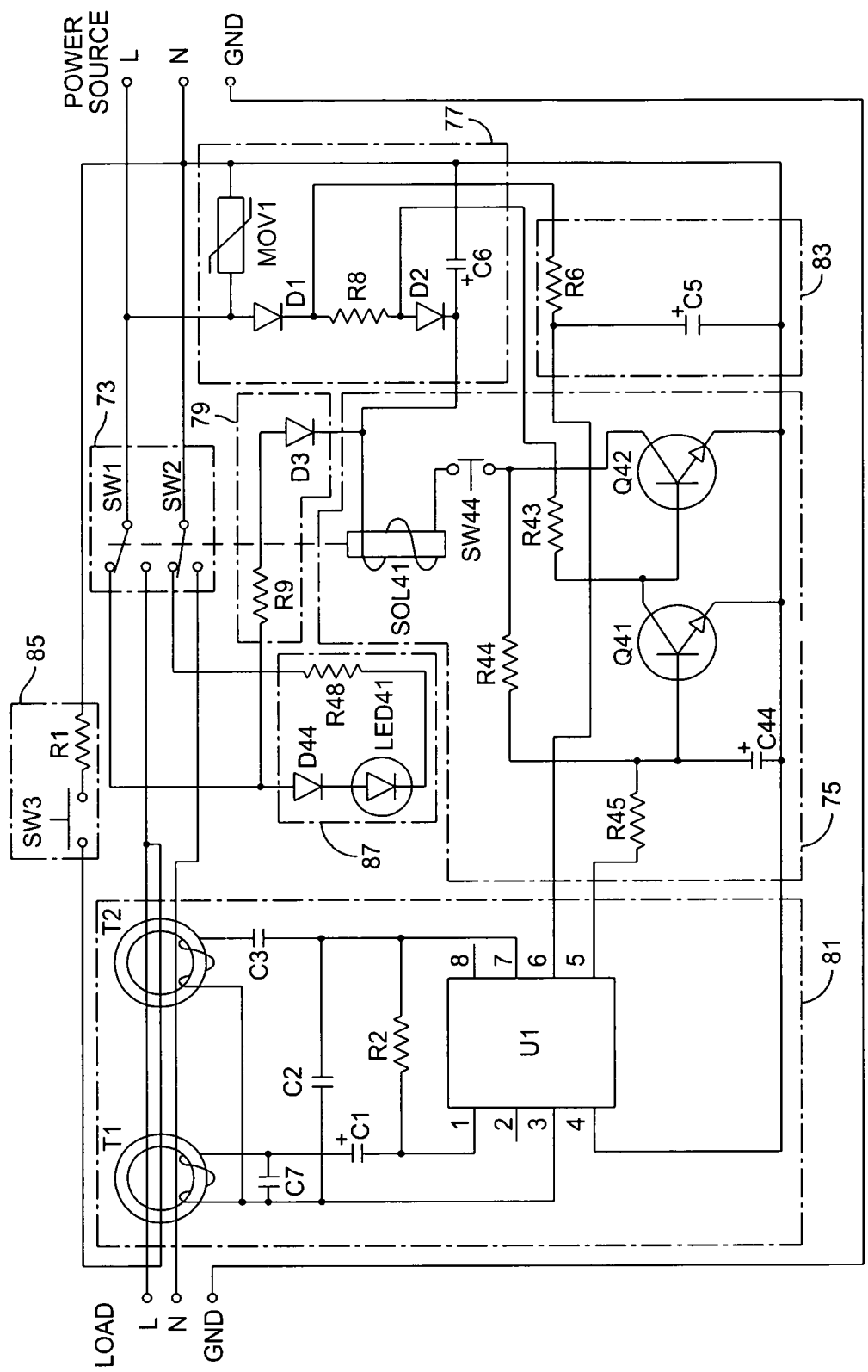

FIG. 5 shows another ground fault circuit interrupter (GFCI) constructed according to the teachings of the present invention, the GPCI being represented generally by reference numeral 71. GFCI 71 is automatically set to protect a load from ground fault conditions upon the initial plugging in of the load to a power source. GFCI 71 is also automatically set to protect the load from ground fault conditions once power is restored to the power source after a loss of power. Furthermore, once GFCI 71 protects the load from a ground fault condition, GFCI 71 can be manually reset to protect against further ground fault conditions.

GFCI 71 is similar in construction to GFCI 11. GFCI 71 comprises a circuit breaker 73, a relay circuit 75, a power supply circuit 77, a booster circuit 79, a fault detection circuit 81, a filter circuit 83 and a test circuit 85. GFCI 71 additionally includes a trip indicating circuit 87. Circuit breaker 73, fault detection circuit 81, filter circuit 83 and test circuit 85 are identical in construction and function to circuit breaker 13, fault detection circuit 21, filter circuit 25 and test circuit 27, respectively. Relay circuit 75 resembles a hybrid of relay circuit 15 and latch circuit 23 of GFCI 11. Specifically, relay circuit 75 comprises a solenoid SOL41, a first transistor Q41, a second transistor Q42, a reset switch SW44, a load resistor R45, a feedback resistor R44, an input resistor R43 and a noise suppression capacitor C44.

Solenoid SOL41 is identical in construction and function to solenoid SOL1. First transistor Q41 may be any suitable device such as an MPSA42 transistor and acts to control the current supplied to second transistor Q42. Second transistor Q42 may be any suitable device such as a MPSA42 transistor and acts to control the current supplied to solenoid SOL41. Reset switch SW44 is a normally closed, pull-open type switch which connects solenoid SOL41 to second transistor Q42. Load resistor R45 is preferably 100 K ohms and acts to provide the required collector voltage for first transistor Q41. Feedback resistor R44 is preferably 68 K ohms and acts to provide base current to first transistor Q41. Input resistor R43 is preferably 2 K ohms and acts, in association with resistor R44, to bias the gate current to first transistor Q41. Noise suppression capacitor C44 is preferably 2.2 uF and acts to prevent first transistor Q41 from conducting as a result of electrical noise in the circuit.

Power supply circuit 77 is identical to power supply circuit 17 with the exception being that circuit 77 does not include the bleeder resistor R7 or the rectifier D4 present in circuit 17.

Trip indicating circuit 87 provides a means of visual indication that the GFCI has tripped in response to a ground fault or grounded neutral condition. Trip indicating circuit 87 includes a silicon rectifier D44, a light emitting diode LED41 and a current limiting resistor R48. Rectifier D44 may be any suitable device such as an IN4004 rectifier and acts to convert the AC power of the line to DC power for diode LED41. Diode LED41 provides visual indication by means of a light that circuit 71 has tripped. Resistor R48 is preferably 47 K ohms and acts to limit the current which passes to diode LED41. In use, GFCI 71 functions in the following manner. Prior to connection, switches SW1 and SW2 are in their first connective position as shown in FIG. 5. Upon initial connection of GFCI 71 at one end to the load and at the other end to the power source, line voltage is supplied into booster circuit 79, which, in turn passes through resistor R9 and rectifier D3 into solenoid SOL41, the line voltage of approximately 120 volts energizing the solenoid. Once solenoid SOL41 is energized, solenoid SOL41 causes switches SW1 and SW2 to move into their second connective position (opposite the position shown in FIG. 5), thereby eliminating the supply of power into solenoid SOL41 from booster circuit 79. However, since line voltage is converted into 28 volts by power supply circuit 77 and is constantly supplied to solenoid SOL41, solenoid SOL41 is maintained in its energized state.

With solenoid SOL41 maintained in its energized state, first transistor Q41 is off and second transistor Q42 is on, thereby enabling current to pass into solenoid SOL41 to keep it in its energized state. Upon the detection of a ground fault or grounded neutral condition, fault detection circuit 81 sends a current to first transistor Q41 turning it on which, in turn, turns off second transistor Q42. With second transistor Q42 off, current does not pass through solenoid SOL41, causing solenoid SOL41 to become de-energized. Once de-energized, solenoid SOL41 causes switches SW1 and SW2 to return to their first connective position, thereby cutting off power from the power source to the load.

With switches SW1 and SW2 in their first connective position, line voltage passes into trip indicating circuit 87 which, in turn, causes light emitting diode LED41 to light up, thereby indicating that circuit 71 has been tripped. Once the fault condition is removed, circuit 71 can be reset by pulling open reset switch SW44. Opening of switch SW44 turns off first transistor Q1, which enables solenoid SOL1 to become re-energized and the cycle repeats.

Figure 6:
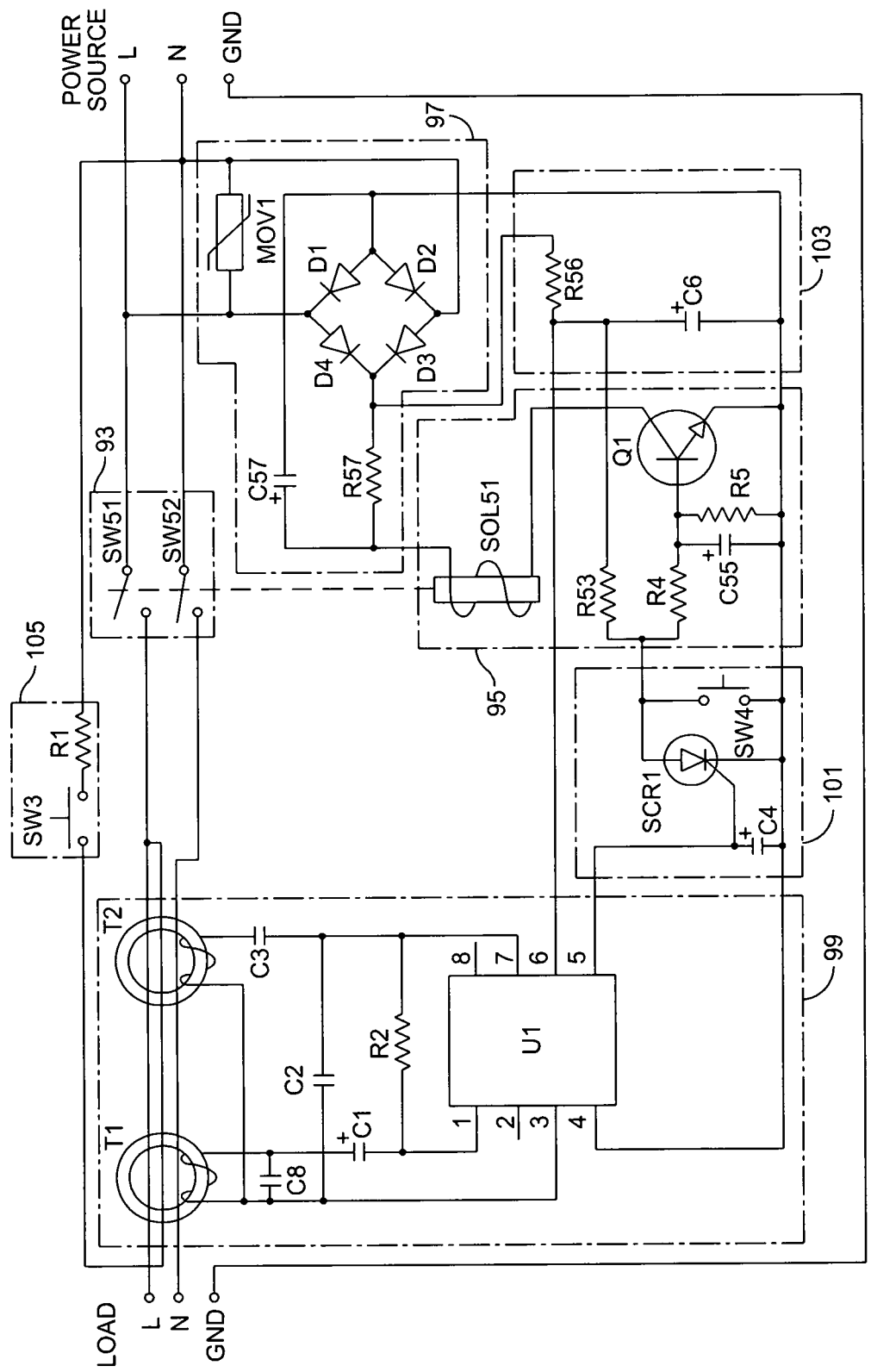

FIG. 6 shows another ground fault circuit interrupter (GFCI) constructed according to the teachings of the present invention, the GFCI being represented generally by reference numeral 91. As will be discussed in detail below, GFCI 91 requires manual depression of a reset switch in order to protect a load from ground fault conditions upon the initial plugging in of the load to a power source. GFCI 91 also requires manual depression of a reset switch in order to protect the load from ground fault conditions once power is restored to the power source after a loss of power. Furthermore, once GFCI 91 protects the load from a ground fault condition, GFCI 91 requires a manual reset to protect against further ground fault conditions.

GFCI 91 is similar in construction to GFCI 11. GFCI 91 includes a circuit breaker 93, a relay circuit 95, a power supply circuit 97, a fault detection circuit 99, a bi-stable electronic latch circuit 101, a filter circuit 103 and a test circuit 105. Fault detection circuit 99, latch circuit 101 and test circuit 105 are identical in construction and function to fault detection circuit 21, latch circuit 23 and test circuit 27, respectively.

Circuit breaker 93 differs from circuit breaker 13 in that switches SW51 and SW52 in circuit breaker 93 are both normally open, single-pole, single-throw switches rather than the single-pole, double-throw switches SW1 and SW2 found in circuit breaker 13. Switches SW51 and SW52 are positionable in either of two positions; a first position in which switches SW51 and SW52 are open, as illustrated in FIG. 6, such that the AC power from the power source is disconnected to the load, and a second position in which switches SW51 and SW52 are both closed, such that the AC power from the power source is connected to the load.

Relay circuit 95 is identical to relay circuit 15 except with regard to the values of the solenoid, the load resistor and the noise suppression capacitor. In particular, solenoid SOL51 has a coil resistance of 800 ohms, load resistor R53 has a value of 10 K ohms and noise suppression capacitor C55 has a value of 1 uF. Due to the increase in size in solenoid SOL51, solenoid SOL51 requires line voltage to both initially energize solenoid SOL51 and maintain solenoid SOL51 in its energized state.

Power supply circuit 97 comprises a metal oxide varistor MOV1, four silicon rectifiers D1, D2, D3 and D4, a voltage dropping resistor R57 and a storage capacitor C57. Rectifiers D1-D4 together form a conventional diode rectifier bridge to convert the AC power from the line into DC power. Voltage dropping resistor R57 has a value of preferably 5.1 K ohms and acts to limit the input voltage to solenoid SOL51 in order to prevent solenoid SOL51 from closing the circuit breaker contacts from their normally open position. Storage capacitor C57 has a value of preferably 22 uF and acts to charge to full line potential when transistor Q1 turns off, as will be described in detail below.

Filter circuit 103 is identical to filter 25 except in regards to the value of the voltage dropping resistor. Specifically, resistor R56 preferably has a value of 24 K ohms. In use, GFCI 91 functions in the following manner. Prior to connection, switches SW51 and SW52 are in their first connective position as shown in FIG. 6. Upon initial connection of GFCI 91 at one end to the load and at the other end to the power source, the voltage applied to solenoid SOL51 by power supply 97 through resistor R57, approximately 40 volts, is not enough voltage to energize solenoid SOL51. Once reset switch SW4 is depressed without being released, transistor Q1 turns off. With transistor Q1 turned off, current can not pass to solenoid SOL51 through resistor R57. This, in turn, causes capacitor C57 to instantaneously charge up to full line voltage.

Upon the release of the depression of switch SW4, transistor Q1 turns back on and starts to conduct which, in turn, causes capacitor C57 to dump its charged up line voltage of 120 volts into solenoid SOL51. This causes solenoid SOL51 to become energized which causes switches SW51 and SW52 to be moved into their second position (opposite the position shown in FIG. 6), thereby connecting the power source to the load.

Upon the detection of a ground fault or grounded neutral condition, fault detection circuit 99 sends a current to rectifier SCR1 which, in turn, turns off transistor Q1. With transistor Q1 off, current does not pass through solenoid SOL51 and solenoid SOL51 becomes de-energized. Once de-energized, solenoid SOL 51 causes switches SW51 and SW52 to be returned to their first positions, thereby cutting off power from the power source to the load.

Once the fault condition is removed, circuit 91 can be reset by depressing switch SW4 and the cycle repeats.

Figure 7:
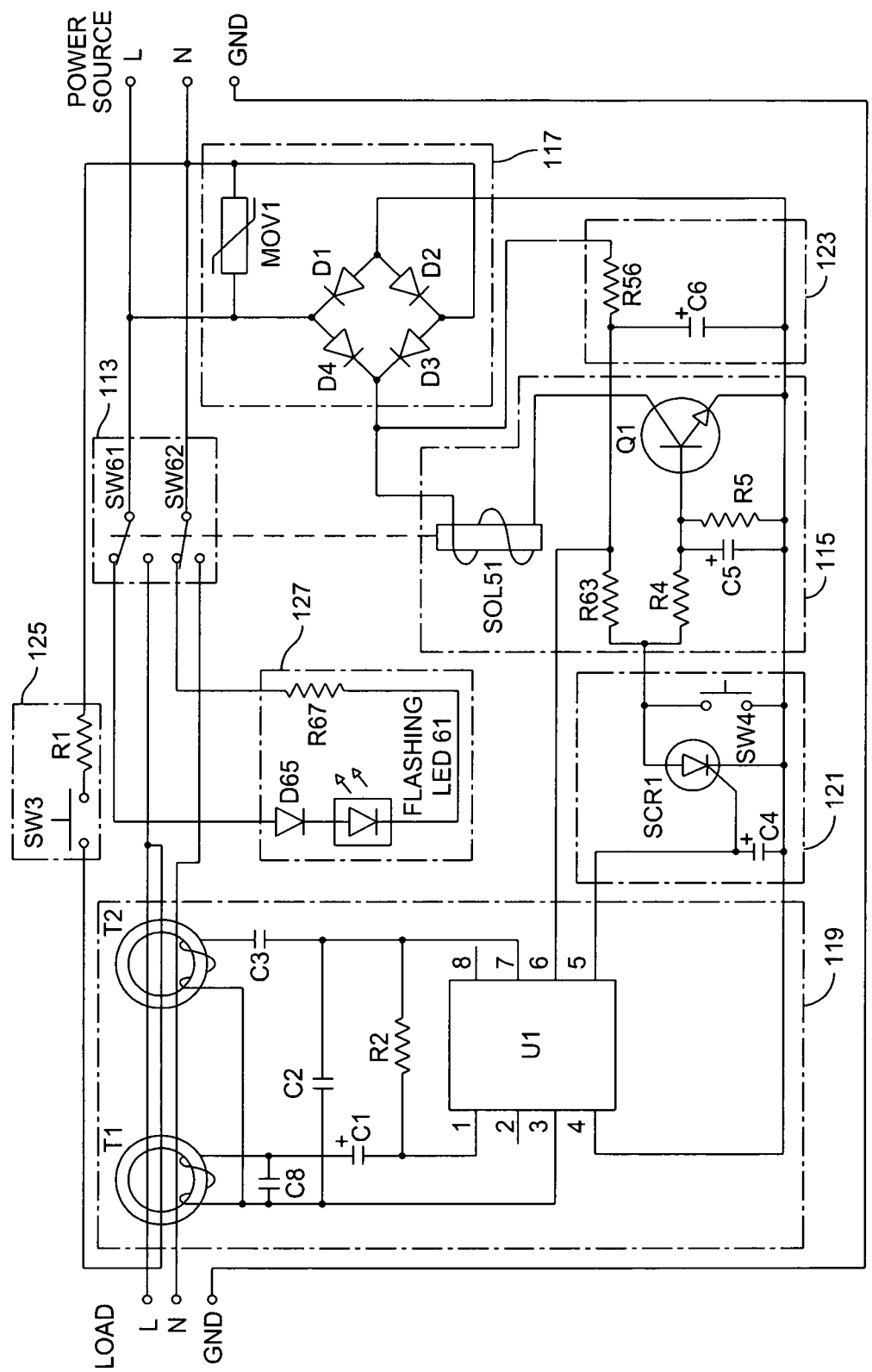

FIG. 7 shows another ground fault circuit interrupter (GFCI) constructed according to the teachings of the present invention, the GFCI being represented generally by reference numeral 111.

GFCI 111 is automatically set to protect a load from ground fault conditions upon the initial plugging in of the load to a power source. GFCI 111 is also automatically set to protect the load from ground fault conditions once power is restored to the power source after a loss of power. Furthermore, once GFCI 111 protects the load from a ground fault condition, GFCI 111 can be manually reset to protect against further ground fault conditions.

GPCI 111 is similar in construction to GFCI 91. GFCI 111 comprises a circuit breaker 113, a relay circuit 115, a power supply circuit 117, a fault detection circuit 119, a latch circuit 121, a filter circuit 123 and a test circuit 125. GFCI 111 additionally includes a trip indicating circuit 127. Fault detection circuit 119, latch circuit 121, filter circuit 123 and test circuit 125 are identical in construction and function to fault detection circuit 99, latch circuit 101, filter circuit 103 and test circuit 105, respectively.

Circuit breaker 113 differs from circuit breaker 93 in that switches SW61 and SW62 of circuit breaker 113 are not single-pole, single-throw switches as in circuit breaker 93 but rather are both single-pole, double-throw switches positionable in either of two positions, namely a first position, as illustrated in FIG. 7, in which the AC power from the power source is disconnected to the load and instead is connected to trip indicating circuit 127, and a second position, opposite the position illustrated in FIG. 7, in which the AC power from the power source is connected to the load.

Relay circuit 115 is identical to relay circuit 95 with the exception of the value of the load resistor. Specifically, load resistor R63 preferably has a value of 4.7 K ohms. Power supply circuit 117 is identical to power supply circuit 97 with the exception being that circuit 117 does not include the voltage dropping resistor R57 and the storage capacitor C57 found in circuit 97.

Trip indicating circuit 127 provides a means of visual indication that the GFCI has tripped in response to a ground fault or grounded neutral condition. Trip indicating circuit 127 includes a silicon rectifier D65, a flashing light emitting diode LED61 and a current limiting resistor R67. Rectifier D65 may be any suitable device such as an IN4004 rectifier and acts to convert the AC power of the line to DC power for diode LED61. Diode LED61 provides a flashing visual indication by means of a light that circuit 111 has tripped. Resistor R67 is preferably 33 K ohms and acts to limit the current which passes to diode LED61.

In use, GFCI 111 functions in the following manner. Prior to connection, switches SW61 and SW62 are in their first connective position as shown in FIG. 7.

Upon initial connection of GFCI 111 at one end to the load and at the other end to the power source, line voltage from the power source is disconnected from the load and rectifier SCR1 is turned off since no base current is applied to rectifier SCR1 from chip U1. At the same time, base current is applied to transistor Q1 from power supply 117 through resistors R63, R56 and R4, turning transistor Q1 on. Also, at the same time, 120 volts DC from power supply circuit 117 is supplied into solenoid SOL51, causing solenoid SOL51 to become energized and moving switches SW61 and SW62 into their second position (opposite the position shown in FIG. 7), thereby enabling power to be supplied into the load.

With solenoid SOL51 in its energized state and transistor Q1 on, solenoid SOL51 is kept in its energized state by 120 volts DC from power supply 117. Upon the detection of a ground fault or grounded neutral condition, fault detection circuit 119 sends a base current to rectifier SCR1 from pin 5 in chip U1 which turns on rectifier SCR1 and which, in turn, turns off transistor Q1. With transistor Q1 off, current does not pass through solenoid SOL51, causing solenoid SOL51 to become de-energized. Once de-energized, solenoid SOL51 causes switches SW61 and SW62 to return to their first connective position, thereby cutting off power from the power source to the load.

Figure 8:
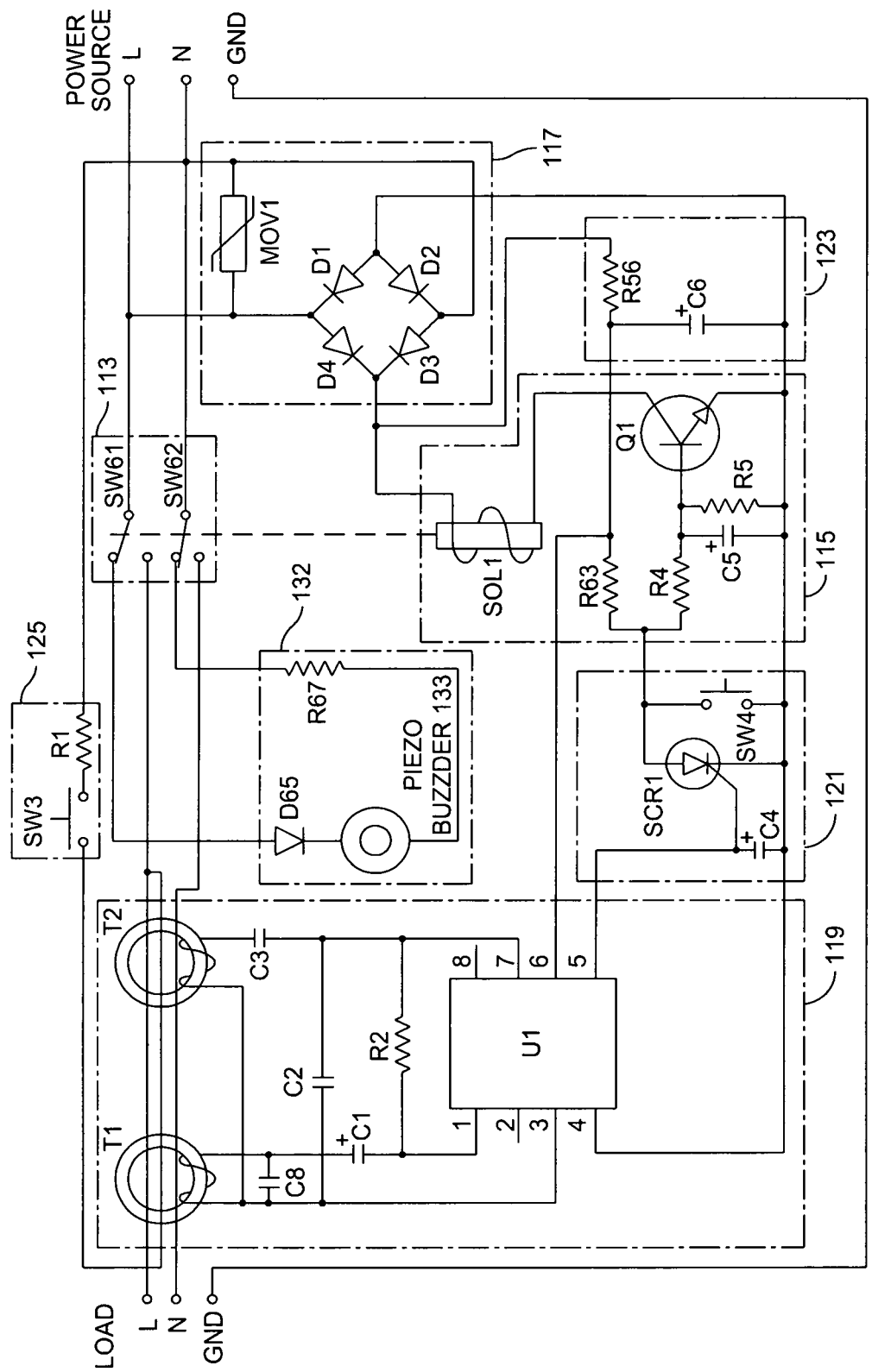

With switches SW61 and SW62 in their first connective position, line voltage passes into trip indicating circuit 127 which, in turn, causes light emitting diode LED61 to light up and flash, thereby indicating that circuit 111 has been tripped. Once the fault condition is removed, circuit 111 can be reset by depressing reset switch SW4. Depression of switch SW4 turns off rectifier SCR1, which allows transistor Q1 to be turned on enabling solenoid SOL51 to become re-energized. FIG. 8 shows another ground fault circuit interrupter (GFCI) constructed according to the teachings of the present invention, the GFCI being represented generally by reference numeral 131.

GFCI 131 is similar to GFCI 111 except for the trip indicating circuit. In particular, instead of the trip indicating circuit containing an LED as in GFCI 111, trip indicating circuit 132 in GFCI 131 includes a piezo buzzer 133 for providing an audio signal indicating a fault rather than a visual signal.

Figure 8A:
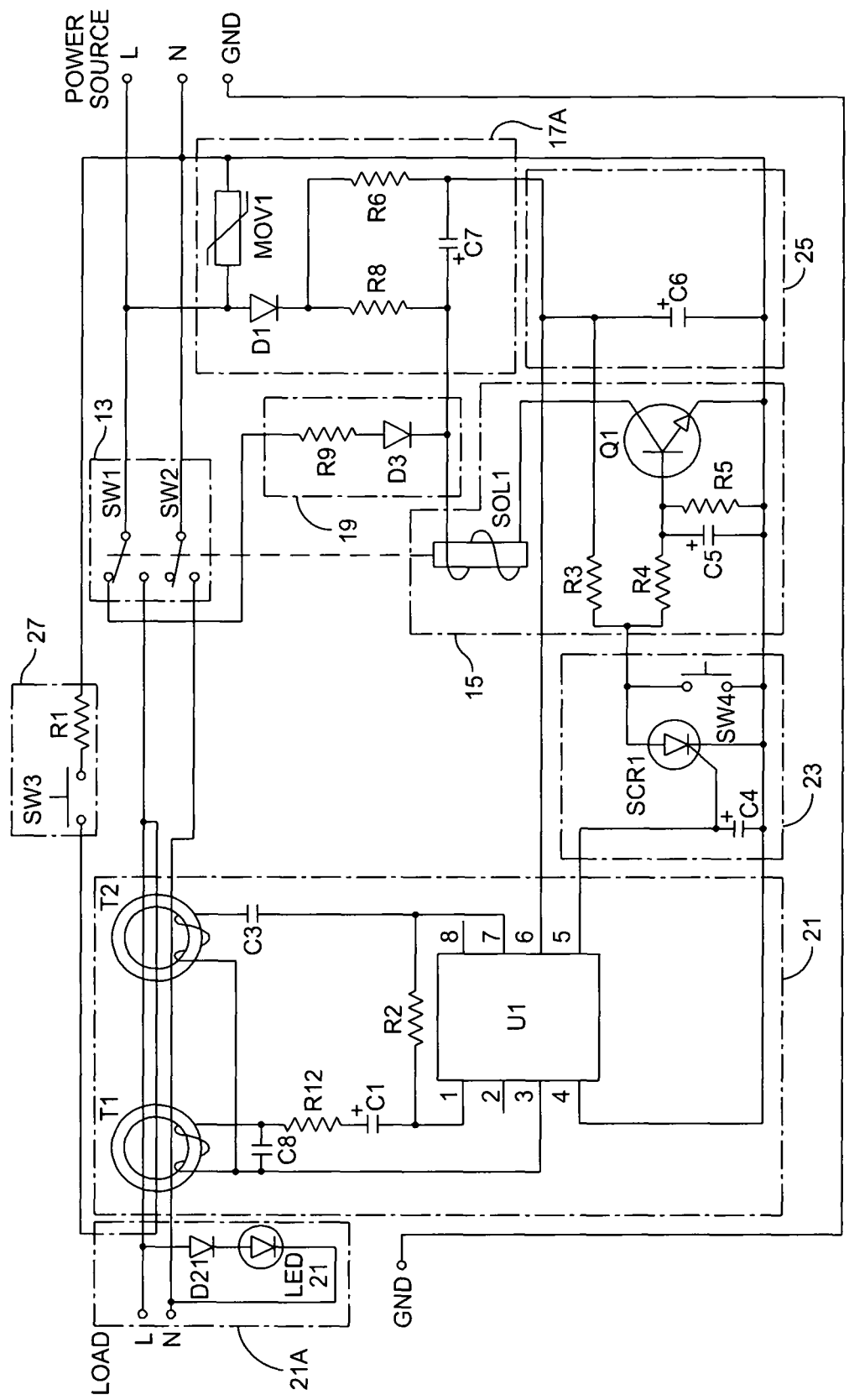
FIG. 8A is a schematic circuit diagram of a GFCI employing the principles of subject invention as shown in FIGS. 9 through 26.

FIG. 8A shows another ground fault circuit interrupter (GFCI) constructed according to the teachings of the present invention, the GFCI being represented generally by reference numeral 141. GFCI 141 is automatically set to protect a load from ground fault conditions upon the initial plugging in of the load to a power source. GFCI 141 is also automatically set to protect the load from ground fault conditions once power is restored to the power source after a loss of power. Furthermore, once GFCI 141 protects the load from a ground fault condition, GFCI 141 can be manually reset to protect against further ground fault conditions.

GFCI 141 is similar in construction to GFCI 11, with the exception being the connection of a trip indicating circuit 21A to fault detection circuit 21, the removal of noise suppression capacitor C2 from fault detection circuit 21, and a power supply circuit 17A that requires fewer components.

In use, GFCI 141 functions in a similar manner to GFCI 11. In both GFCI 11 and GFCI 141, if a ground fault condition is detected by the fault detection circuit, silicon controlled rectifier SCR1 turns on, which turns off transistor Q1 which, in turn, de-energizes solenoid SOL1. However, trip indicating circuit 21A provides a visual means of indication that the GFCI has tripped in response to a ground fault or ground neutral condition. Trip indicating circuit 21A includes a silicon rectifier D21, a light emitting diode LED21, and a current limiting resistor R10. Rectifier D21 may be any suitable device such as an IN4148 rectifier and acts to convert the AC power of the line to DC power for diode LED21. Diode LED21 provides visual indication by means of a light that circuit 141 has tripped. Resistor R10 is preferably 15K-47 K ohms and acts to limit the current which passes to diode LED21.

Figure 8B:
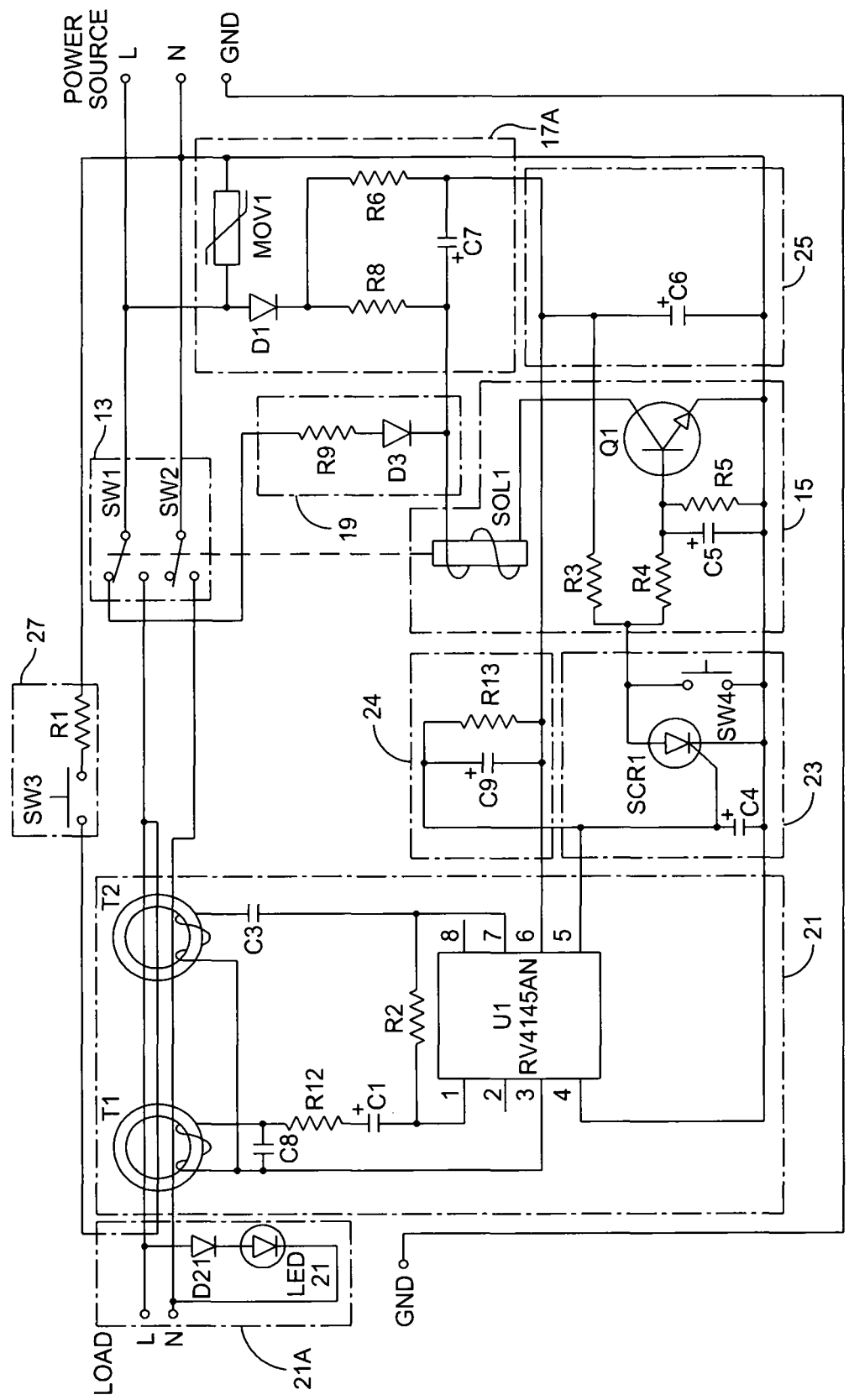
FIG. 8B is a schematic circuit diagram of a GFCI employing the principles of subject invention as shown in FIG. 9 through 26.

FIG. 8B shows another ground fault circuit interrupter (GFCI) constructed according to the teachings of the present invention, the GFCI being represented generally by reference numeral 151. GFCI 151 is automatically set to protect a load from ground fault conditions upon the initial plugging in of the load to a power source. GFCI 151 is also automatically set to protect the load from ground fault conditions once power is restored to the power source after a loss of power. Furthermore, once GFCI 151 protects the load from a ground fault condition, GFCI 151 can be manually reset to protect against further ground fault conditions.

GFCI 151 is similar in construction to GFCI 141, with the exception being the addition of an RC Pulse Circuit 24. In use, GFCI 151 operates in the following manner. Prior to initial connection, switches SW1 and SW2 are normally in their first connective position as shown in FIG. 8B. Upon initial connection of GFCI 151 at one end to the load and at the other end to the power source (Power-up), line voltage of approximately 120 volts is applied to solenoid SOL1 through booster circuit 19 and energizes solenoid SOL1. Once solenoid SOL1 is energized, solenoid SOL1 causes switches SW1 and SW2 to move into their second connective position (opposite the position shown in FIG. 8B), thereby eliminating the supply of power into solenoid SOL1 from booster circuit 19. Without RC Pulse Circuit 24, a constant 28 volts is supplied to solenoid SOL1 from power supply circuit 17, and solenoid SOL1 is maintained in its energized state.

However, RC Pulse Circuit 24 initially pulses on SCR1 (upon Power-up), causing rectifier SCR1 to be in a conductive state, which, in turn turns off transistor Q1 which inhibits current from flowing through Solenoid SOL1. Therefore, upon connection of GFCI 151 at one end to the load and at the other end to the power source the GFCI would remain in their first connective position as shown in FIG. 8B. The GFCI 151 would then require a manual reset through switch SW4 to move switches SW1 and SW2 into their second connective state enabling current to pass to solenoid SOL1.

Upon the detection of a ground fault or grounded neutral condition, fault detection circuit 21 sends a current to rectifier SCR1 causing rectifier SCR1 to be in a conductive state which, in turn, turns off transistor Q1. With transistor Q1 off, current does not pass to solenoid SOL1 and therefore solenoid SOL1 becomes de-energized. Once de-energized, solenoid SOL1 causes switches SW1 and SW2 to return to its first connective position, thereby cutting off power from the power source to the load. RC Pulse Circuit 24 includes capacitor C9 preferably between 0.1 and 0.22 uf and resistor R13 preferably between 900 K ohms and 2 megaohms. After manual reset of SW4, the RC Pulse circuit maintains a voltage on PIN 5 of U1. Upon the detection of a ground fault or grounded neutral condition, fault detection circuit 21 sends a base current to rectifier SCR1 from pin 5 in chip U1 which turns on rectifier SCR1 and which, in turn, turns off transistor Q1. The added voltage on PIN 5 due to the RC Circuit acts to trigger SCR1 quicker since the gate voltage on SCR1 would already be part of the way to its shutoff value.

Figure 8C:
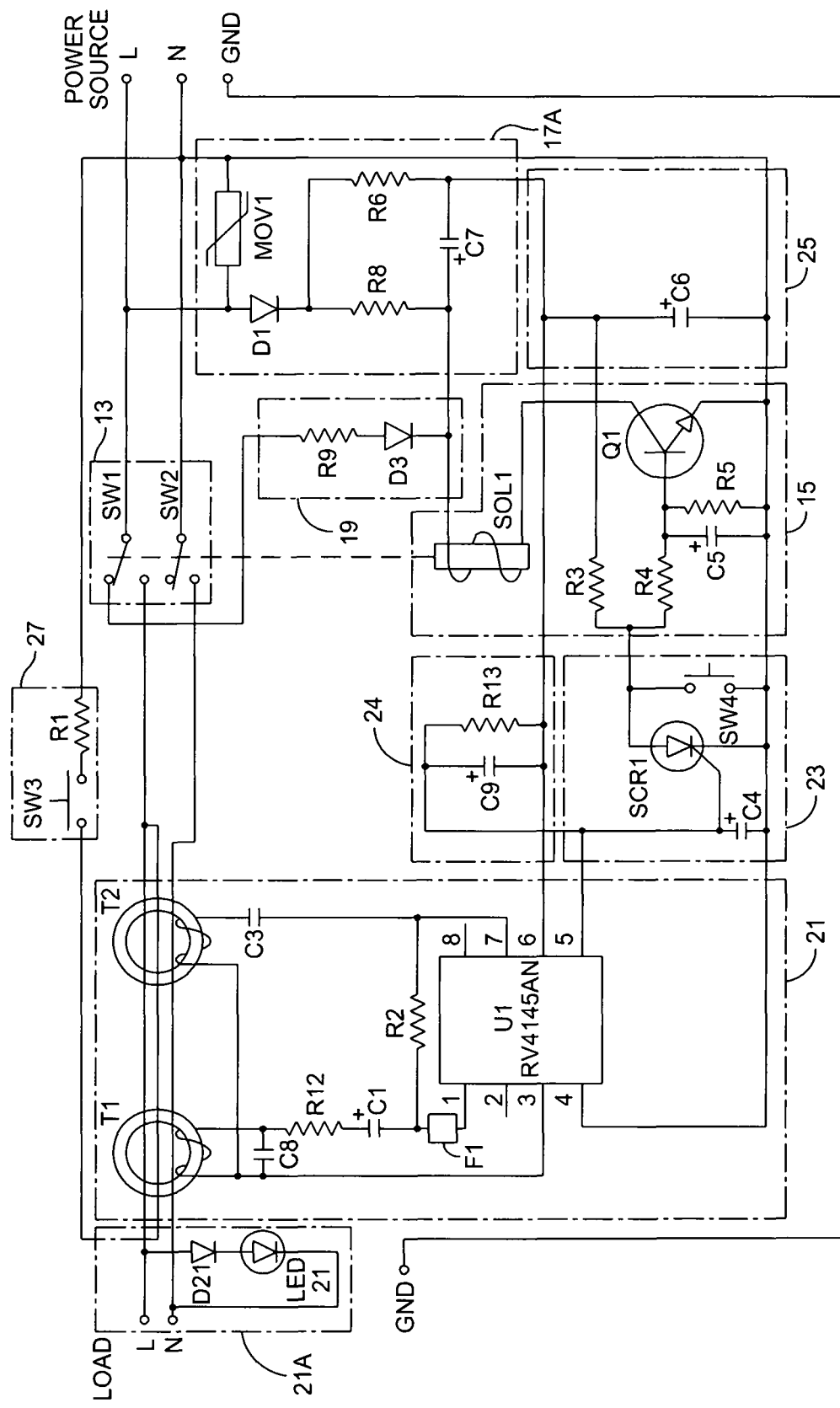
FIG. 8C is a schematic circuit diagram of a GFCI employing the principles of subject invention as shown in FIG. 9 through 26.

FIG. 8C shows another ground fault circuit interrupter (GFCI) constructed according to the teachings of the present invention, the GFCI being represented generally by reference numeral 161. GFCI 161 is automatically set to protect a load from ground fault conditions upon the initial plugging in of the load to a power source. GFCI 161 is also automatically set to protect the load from ground fault conditions once power is restored to the power source after a loss of power. Furthermore, once GFCI 161 protects the load from a ground fault condition, GFCI 161 can be manually reset to protect against further ground fault conditions.

Figure 8D:
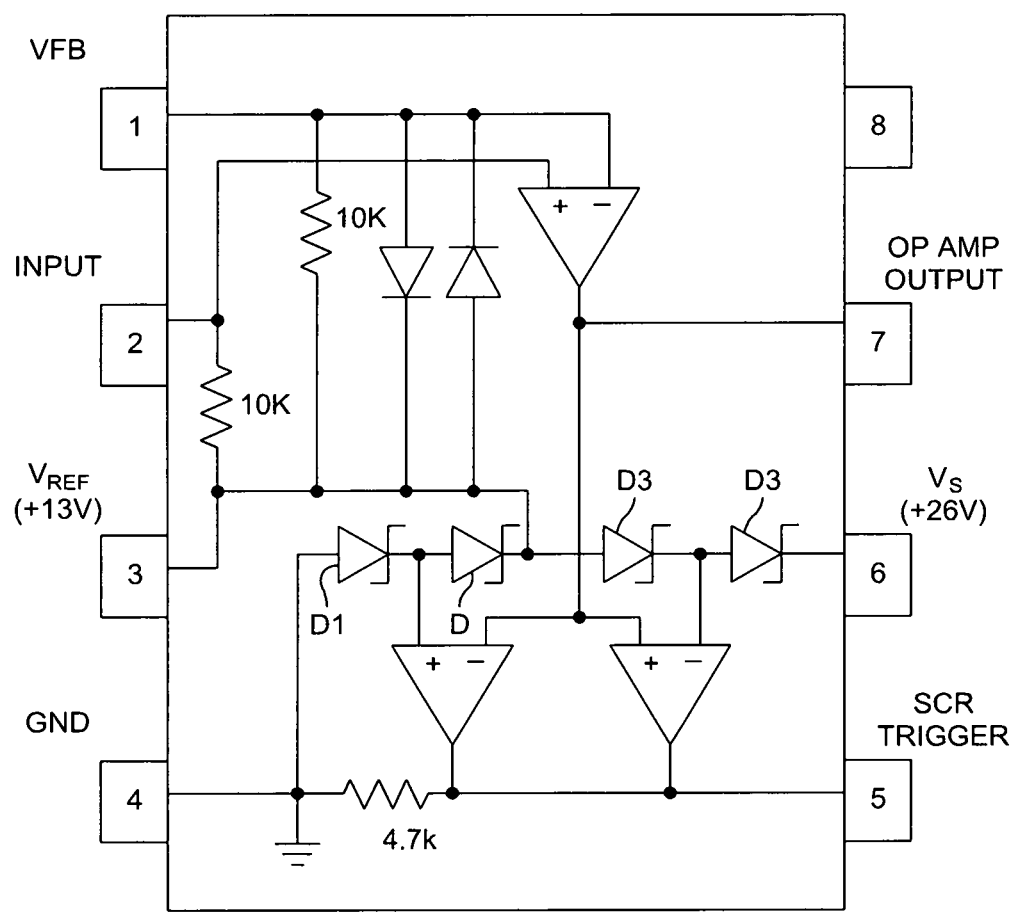
FIG. 8D is a schematic circuit diagram of an example Interrupter Chip U1.

GFCI 161 is similar in construction to GFCI 151, with the exception being the addition of a passive ferrite bead F1 for RF Suppression. Ferrite bead F1 helps to prevent unwanted RF noise from being coupled into pin 1 of U1, and also the inverting input of the Op Amp internal to U1 (see FIG. 8D). RF noise presented to the inverting input of Op Amp (pin 1 of U1) may be amplified sufficiently to trigger one of the comparator amplifiers shown in FIG. 8D, thereby outputting an unwanted SCR trigger signal on pin 5. It will be appreciated that any suitable passive electric component may be used to suppress unwanted frequency noise. It is further understood that ferrite bead F1 could be added to any other embodiments 1-8B previously disclosed.

Figure 9:
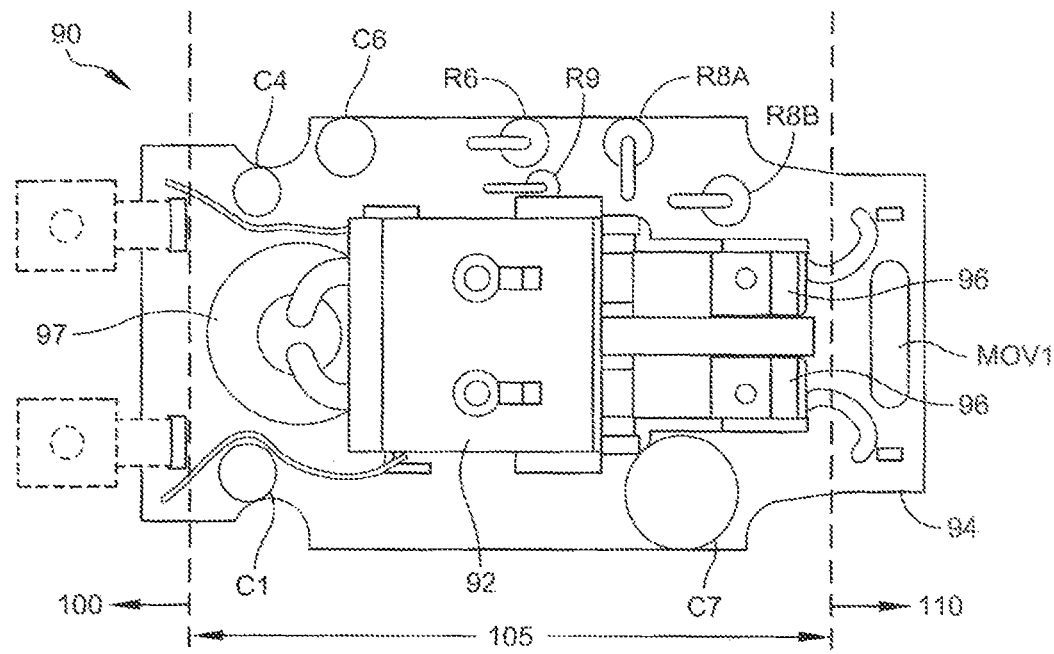
FIG. 9 shows a top plan view of a GFCI PCB component layout employing the principles of subject invention described herein.
Figure 11:
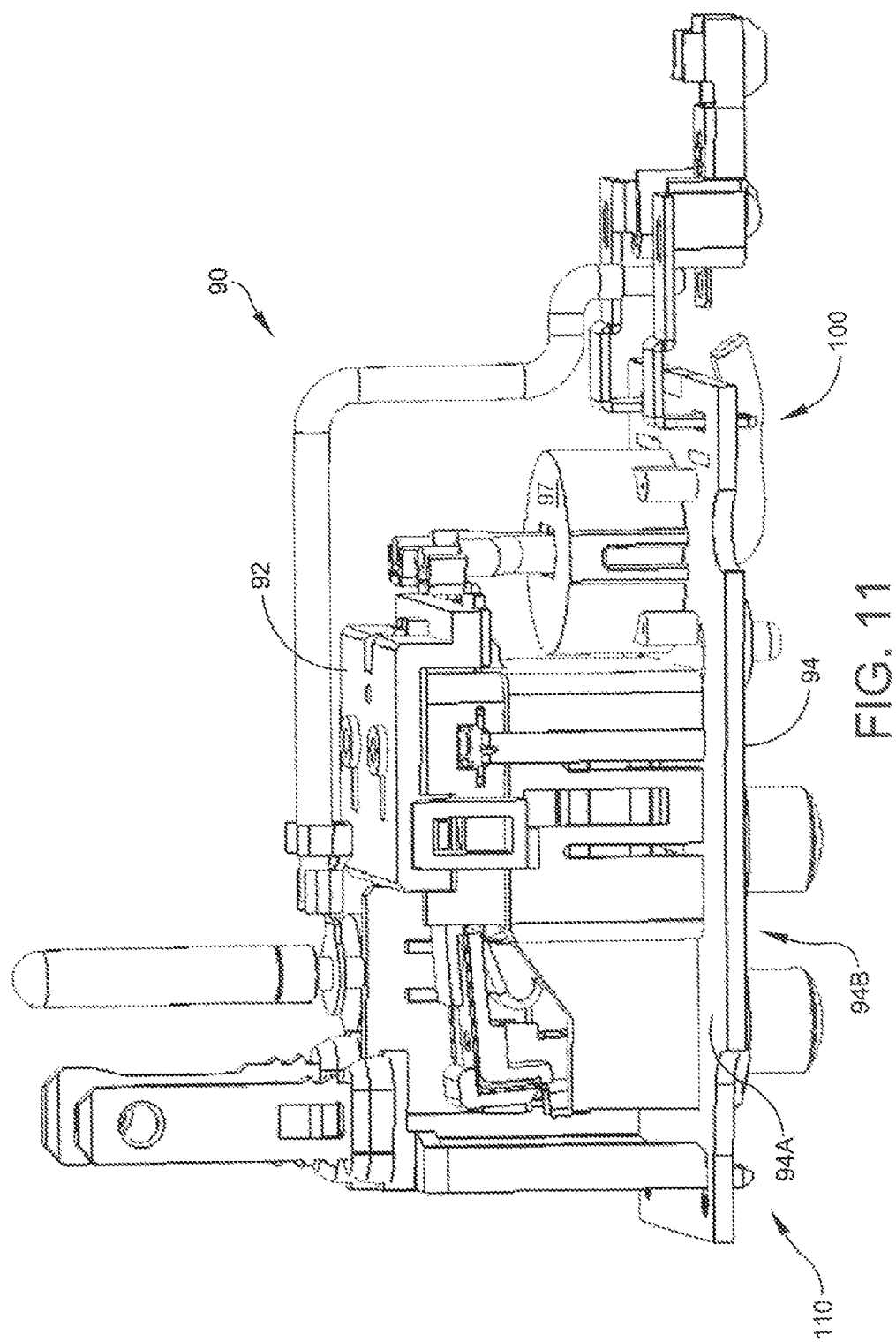
FIGS. 11-13 illustrates the GFCI PCB Component layout.
Figure 13:
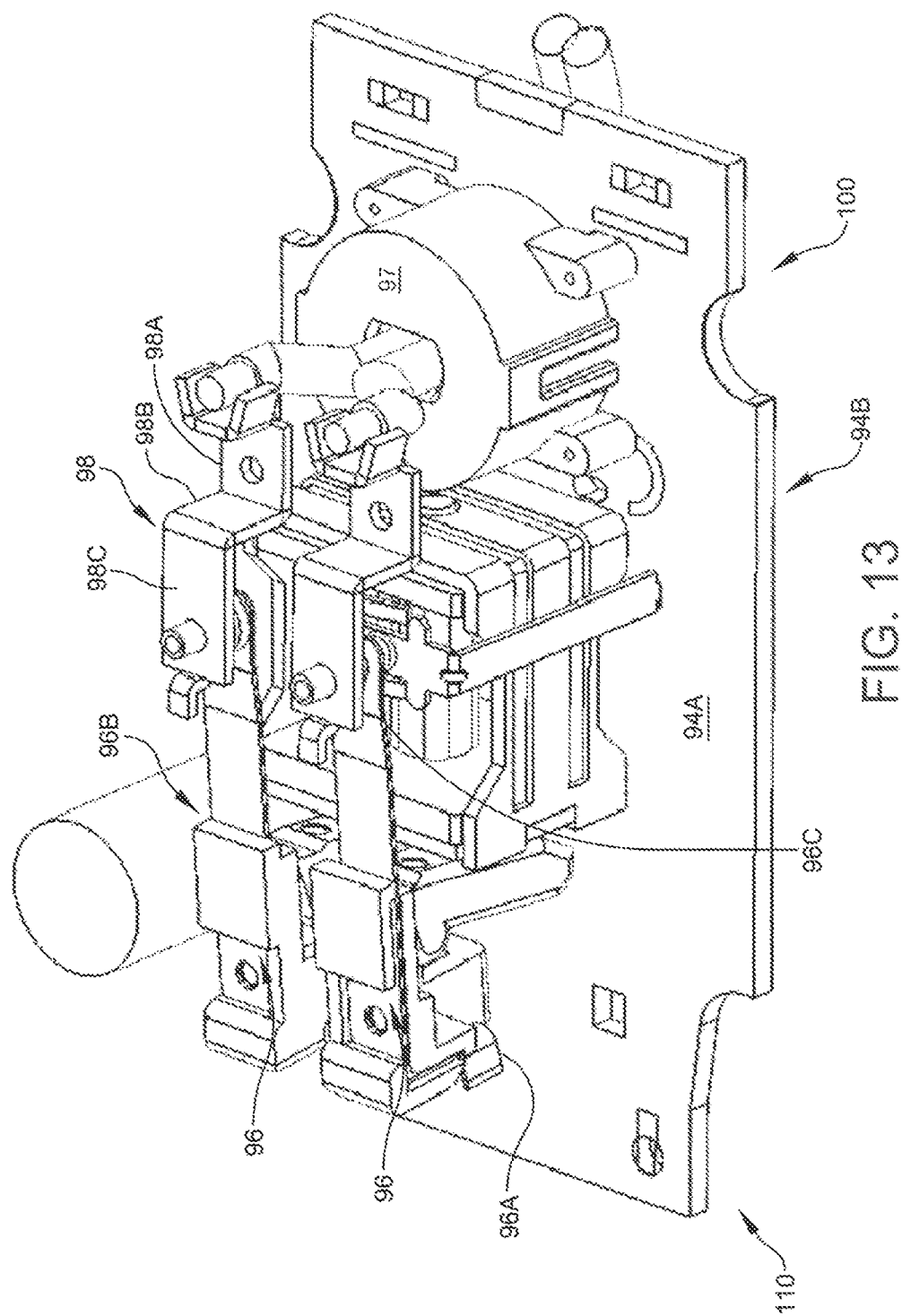

Referring to FIG. 9 there is shown a top plan view of the universal GFCI PCB package 90. The GFCI PCB package 90 includes stationary housing assembly 92, capacitors C1, C4, C6, and C7, resistors R6, R8A, R8B, and R9; and MOV 1 mounted on a top surface of printed circuit board (PCB) 94. Stationary housing assembly 92 encases a portion of current carrying switches SW1 and SW2 (FIGS. 1-8C) and solenoid 93. In one embodiment solenoid 93 is positioned in the center of circuit board 94 with its bottom surface 93A attached at circuit board top surface 94A. Housing assembly 92 is necessary to isolate currents of up to 15 amps. As illustrated in FIGS. 11 and 13, portions of moveable contact arms 96 of switches SW1 and SW2 and portions of load input contact arms 98 of switches SW1 and SW2 are encased by housing assembly 92.

Figure 12:
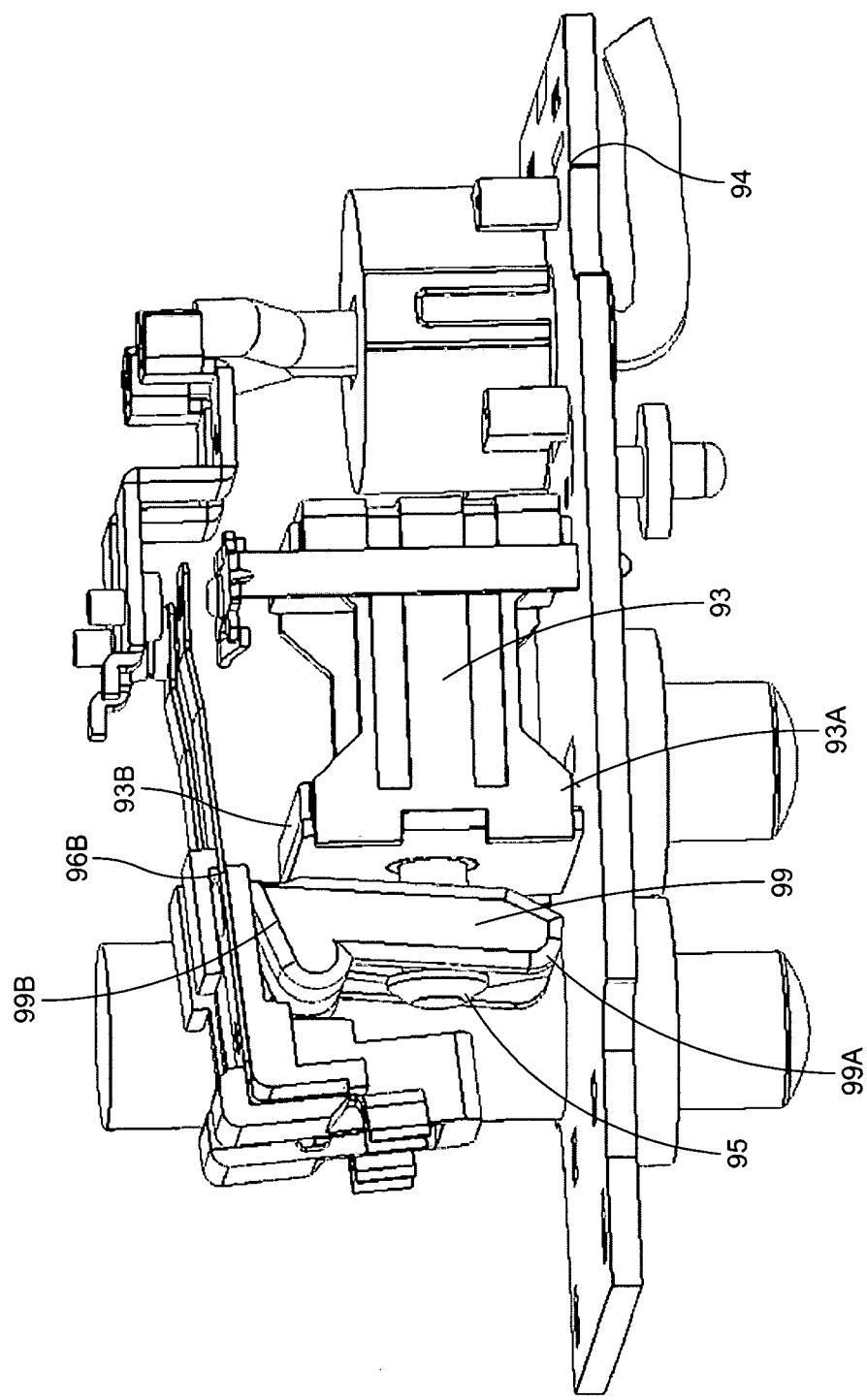

As illustrated in FIGS. 12 and 13, the switch assembly located interior to the stationary housing 92 is illustrated. The moveable contact arms 96 include a first end 96A, a middle portion 96B, and a second end 96C and the load input contact arms 98 include a first end 98A, a middle portion 98B, and a second end 98C. The first end 98A of the load input contact arm 98 is connected to the load input interface 100 and the first end 96A of the moveable contact arm 96 connects to the power source input 110. In one embodiment, the second end 98C of the load input contact arm 98 and said second end 96C of the moveable contact 96 are in substantial alignment and positioned above the top surface 93B of solenoid 93 to conserve space on circuit board 94. The second end 98C of the load input contact arm 98 and said second end 96C of the moveable contact arms 96 are engaged (in contact) when the solenoid is energized and are disengaged (not in contact) when the solenoid is de-energized.

The solenoid 93 includes a plunger 95 that laterally extends outward from the solenoid 93 and in one embodiment is substantially parallel to the circuit board 94 top surface 94A. Plunger 95 controls an actuator 99 where the actuator moves from a first position to a second position. The first position of actuator 99 occurs when solenoid 93 is de-energized causing the actuator 99 to release from contact with moveable arm 96, causing moveable contact arm 96 second end 96C and load input contact arm 98 second end to disengage and prevent the flow of electricity from the source to the load.

Moveable contact arm 96 is resiliently flexible and moves from its normal position (when solenoid 93 is de-energized) to a closed position when solenoid 93 is energized, causing moveable contact arm 96 second end 96C and load input contact arm 98 second end to engage and allow the flow of electricity from the source to the load. In one embodiment the actuator 99 engages at the middle portion 96B of the moveable contact arm 96, the actuator 99 including a first end 99A and a second end 99B where the first end 99A is moveable by the plunger 95 to rotate the second end 99B for engaging the middle portion 96B of the moveable contact arm 96. In one embodiment, the actuator 99 is substantially vertical with the second end 99B having a sloped top surface. To conserve space on circuit board 94, both moveable contact arms 96 and load input contact arms 98 are substantially parallel to and extend above solenoid 93 top surface.

The Sensor coil housing 98 encases sense transformers T1 and T2 (FIGS. 1-8C). Stationary Housing Assembly 92, Moving Arms 96, and Sensor Coil Housing are arranged on the circuit board to free up space on the GFCI PCB package 90 for the load input interface section 100, and Power Source input interface Section 110 located at opposite ends of GFCI PCB package 90.

Figure 10:
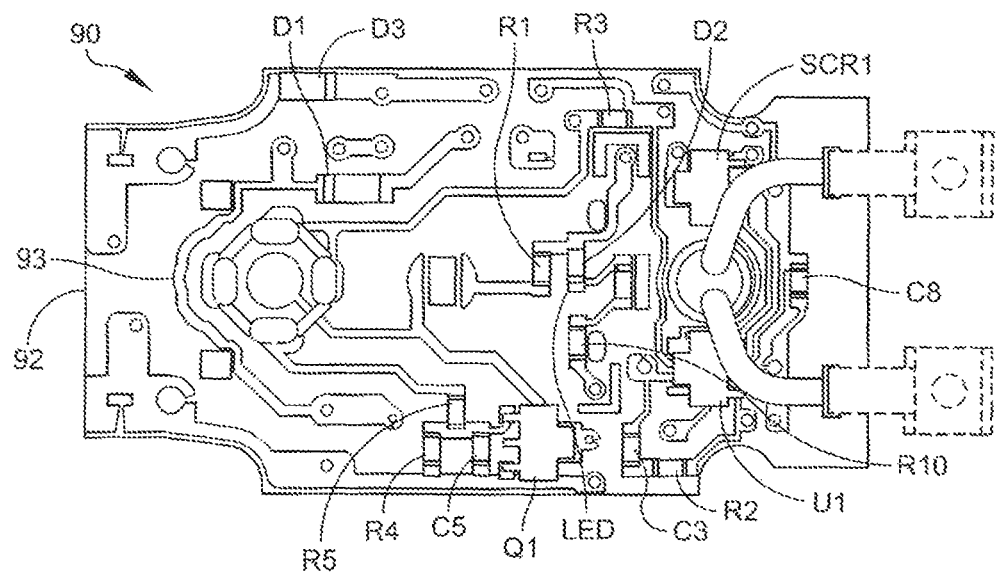
FIG. 10 shows a bottom plan view of a GFCI PCB component layout employing the principles of subject invention described herein.

Referring also to FIG. 10 there is shown a bottom plan view of the GFCI PCB package 90. The universal GFCI PCB package 90 includes components mounted on a bottom surface of PCB 90. Also shown in FIG. 10 are surface traces 93 connecting the top and bottom PCB components. It will be appreciated that the components, and circuit traces shown in FIG. 9 and FIG. 10 are strategically arranged to minimize required spacing while simultaneously maintaining arcing and dielectric breakdown prevention distances between each of the components and surface traces. In the preferred embodiment, the GFCI PCB includes a GFCI PCB substantially 2.75 inches by 1.5 inches and includes a top surface having a stationary assembly as indicated in FIGS. 9,10.

Any of the circuit embodiments of the GFCI as illustrated in FIGS. 1-8C may be packaged in the physical circuit configuration as illustrated in FIGS. 9 through 13. Referring to FIG. 9, the layout of the GFCI PCB package can be separated into a load input interface section 100, a GFCI Circuit Section 105, and a Power Source input interface Section 110. By configuring PCB Package 90, as illustrated in FIGS. 9 through 13, multiple configurations of enclosures can be utilized with only peripheral interface hardware changes occurring at the load input interface section 100 and power source input interface section 110. As illustrated in FIGS. 9-13, the load input interface section 100 and power source input interface section 110 are located at opposite ends of GFCI PCB 90, adjacent to GFCI circuit section 105.

Figure 14:
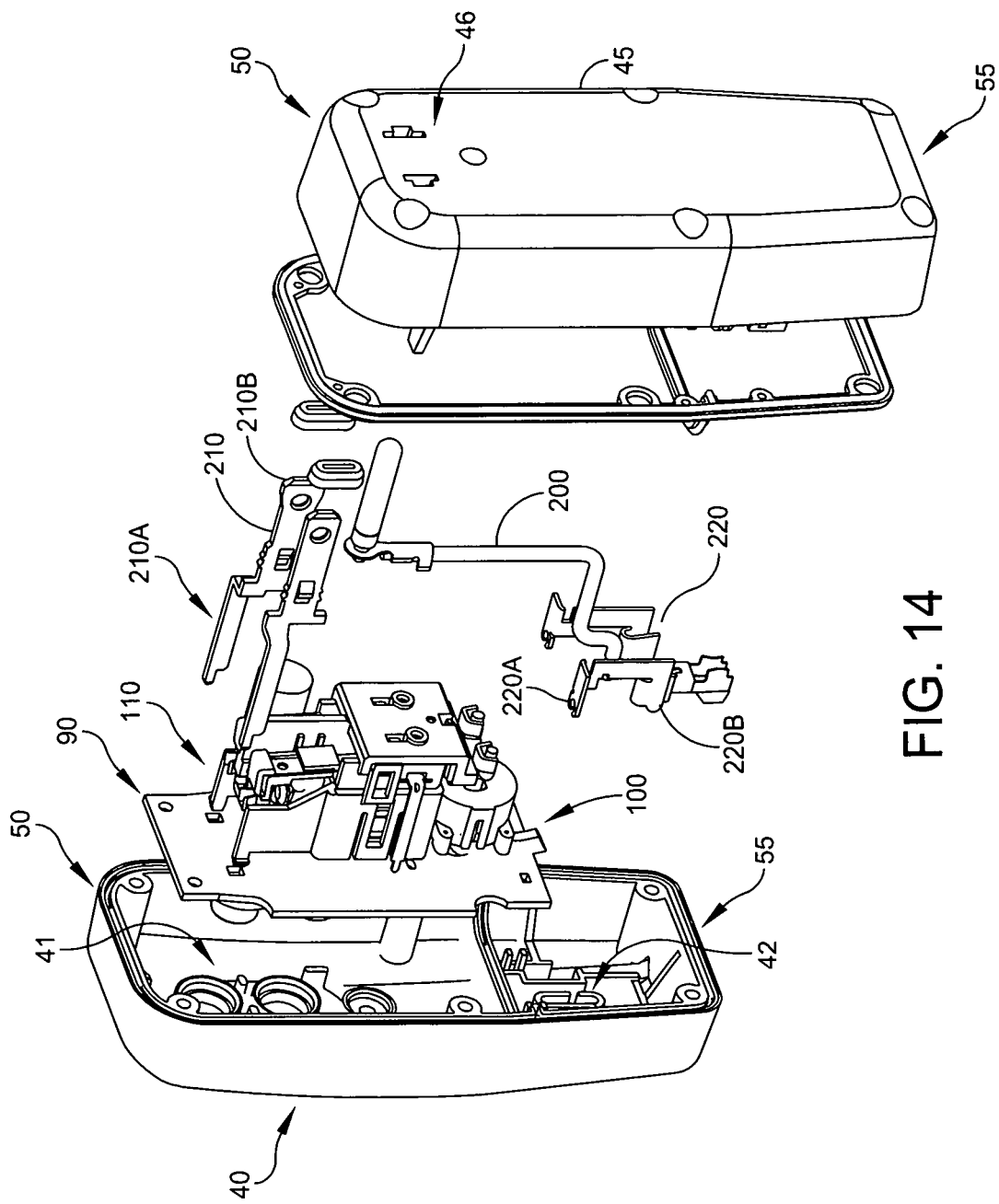
FIGS. 14-16 illustrate exploded views of the GFCI PCB of FIGS. 9-13 as embodied in various GFCI Enclosures.
Figure 17:
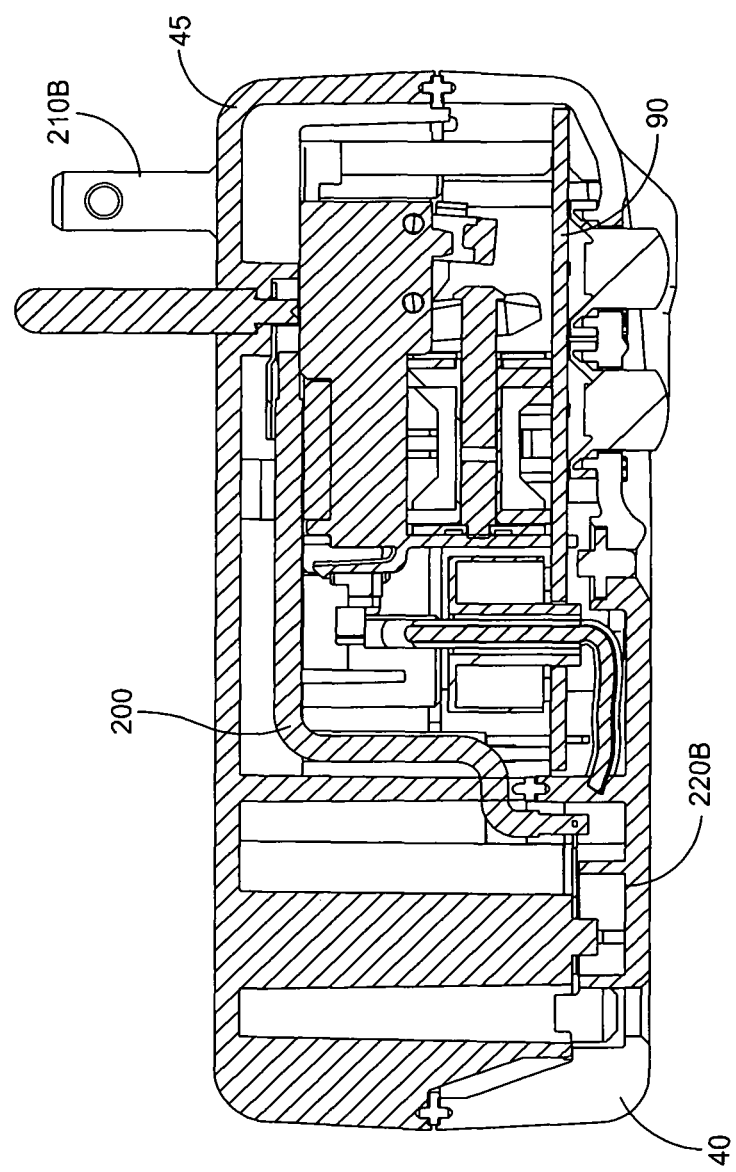
FIG. 17 is a cross-sectional view of the GFCI of FIGS. 11-13.

As illustrated in FIGS. 14 and 17, a GFCI Enclosure having a female receptacle load conductor 220 (for 3 prong plug connection) and 90 degree male receptacle power source input conductors 210 is interfaced to GFCI PCB 90 and integrated into a single enclosure, the enclosure having a top 40, bottom 45, front 50 and rear 55. Conductors 210 include a first end 210A for direct interface to power source input interface section 110, and a second end 210B for exiting GFCI enclosure bottom 45 at a 90 degree angle. Female load conductors 220 are configured within the GFCI enclosure of FIG. 14 and allow for a three prong plug assembly (not shown) load input. Female load conductors 220 include a first end 220A for direct interface to load input interface section 100 and a second end 220B having openings for engagement of a load input 3-prong plug (not shown).

Figure 18:
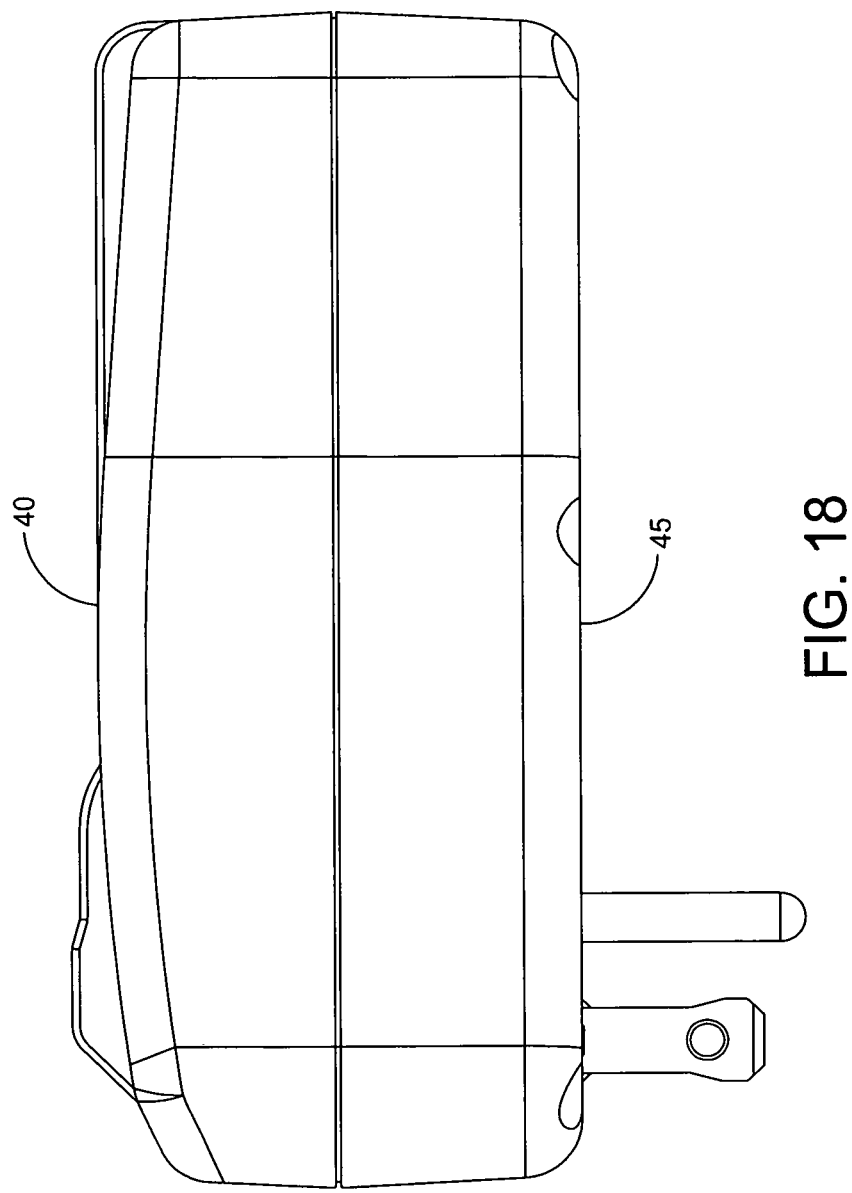
FIG. 18 is an assembled view of FIG. 14.

A ground conductor 200 fitted within the enclosure of FIG. 14 allows for a ground path from the prong assembly of the load input interface 100 to the input conductors 210 of the power source input interface 110. FIG. 18 illustrates the assembled GFCI device of FIG. 14. As illustrated in FIG. 14, the GFCI enclosure includes a top 40, bottom 45, front 50 and rear 55. Top 40 includes a GFCI PCB 90 mounting section 41 and load conductor 220 mounting section 42. Bottom section 45 includes openings 46 for the exiting of conductors 210B.

Figure 15:
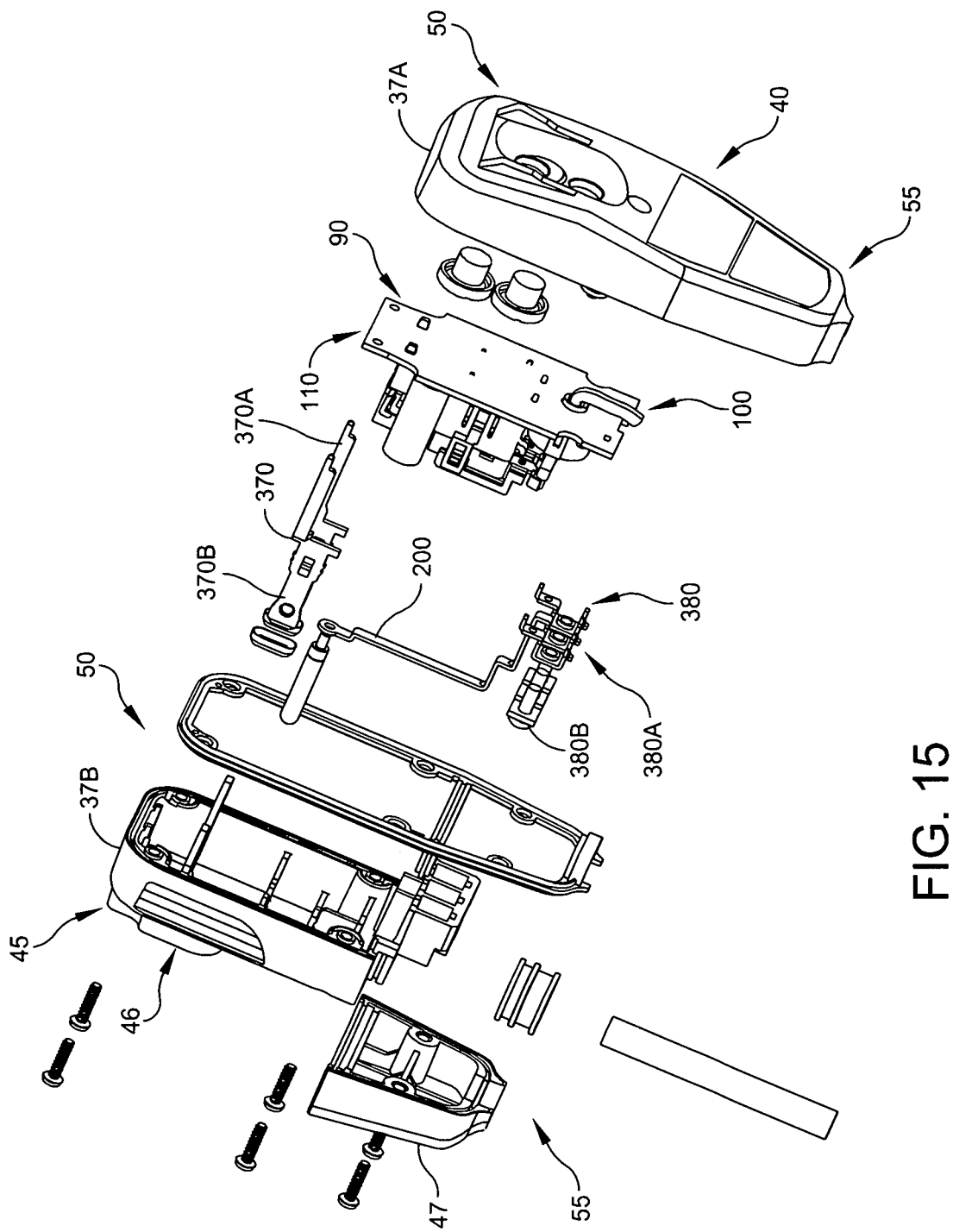

Illustrated in FIG. 15, is a GFCI enclosure having an in-line load input and a 90 degree male receptacle power source input contained in a single enclosure, and interfaced to the GFCI PCB 90. Male conductors 370 include a first end 370A for direct interface to power source input interface section 110, and a second end 370B for exiting GFCI enclosure section 37B at a 90 degree angle. Input conductors 380 are configured for an external load connection thereto, and are connected to load input interface section 100. Input conductors 380 may be any screw or plug in fastening bar having one end 380A for direct interface to load input interface section 100 and an opposite end 380B for connection of an in-line load input.

A ground conductor 200 fitted within the enclosure of FIG. 15 allows for a ground path from input conductors 380 of the load input interface section 100 to the input conductors 370 of the power source input interface 110. As illustrated in FIG. 15, the GFCI enclosure includes a top 40, bottom 45, front 50 and rear 55. Top 40 includes a GFCI PCB 90 mounting section. Bottom section 45 includes openings 46 for the exiting of conductors 370B and a removable bottom section 47, for access to input conductors 380 and for the protective covering of a load input thereto.

Figure 16:
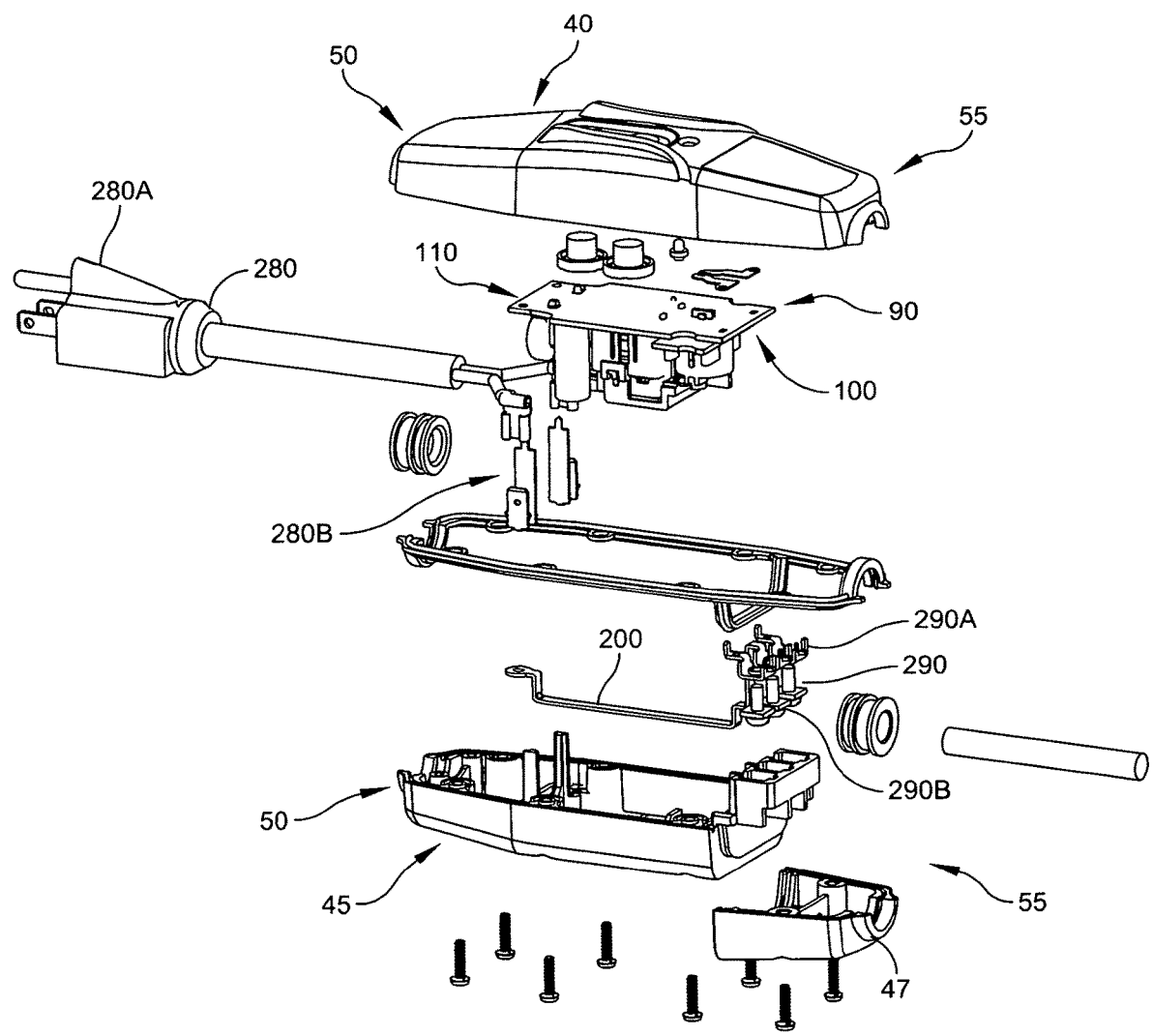
Figure 19:
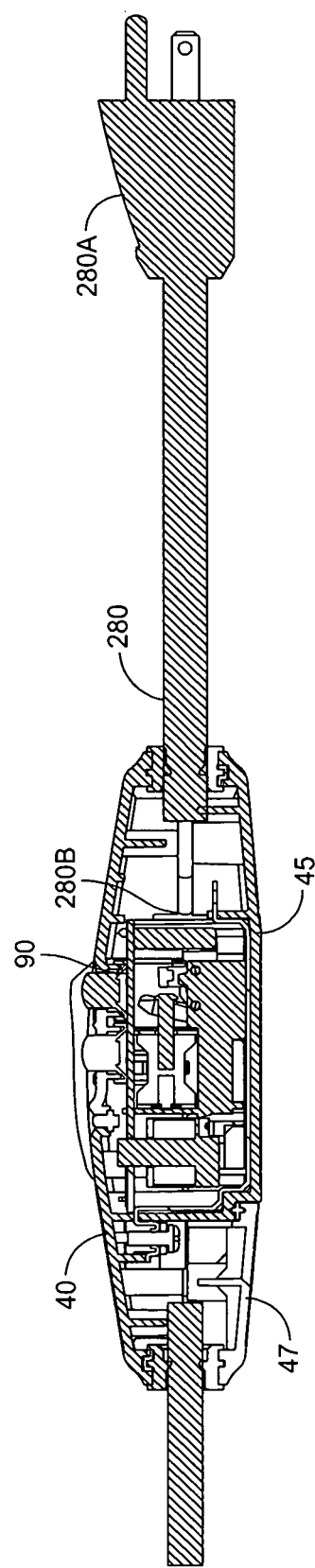
FIG. 19 is a cross-sectional view of FIG. 16.

As illustrated in FIG. 16 and FIG. 19, for a GFCI enclosure having an in-line load input and an in-line power source input, the GFCI PCB 90 is connected to power source conductors 280 and input load conductors 290. Male plug conductors 280 include a first end 280A for plug-in to an outlet receptacle, and a second end 280B for mating to power source input interface section 110. Input conductors 290 are configured for an external load connection thereto, and are directly interfaced to load input interface section 100. Input conductors 290 may be any screw or plug in fastening bar having one end 290A for direct interface to load input interface section 100 and an opposite end 290B for connection of an in-line load input.

Figure 20:
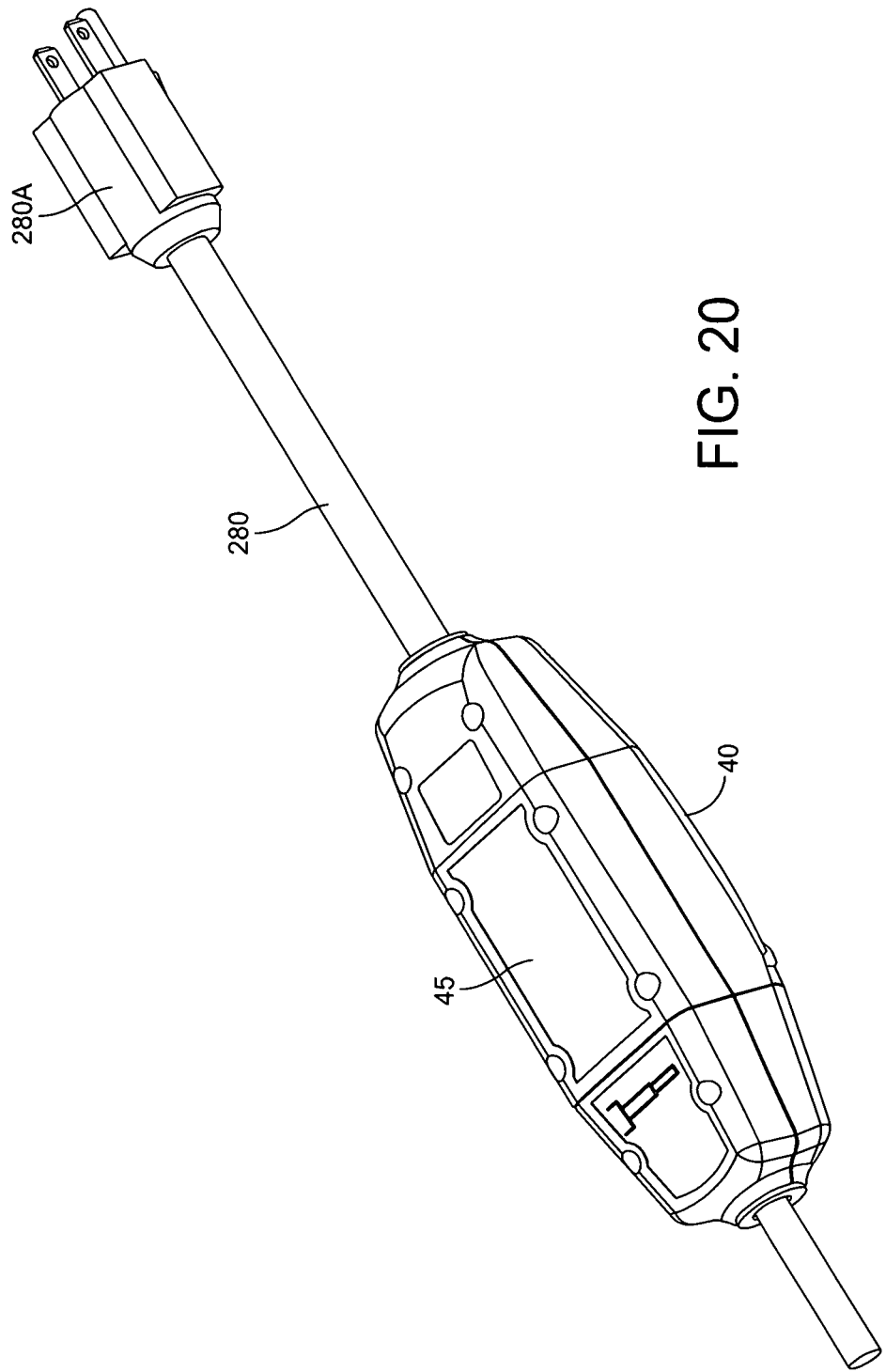
FIG. 20 is an assembled view of FIG. 16.

A ground conductor 200 fitted within the enclosure of FIG. 16 allows for a ground path from load input conductors 290 of the load input interface section 100 to the male power source conductors 280 of the power source input interface section 110. FIG. 20 illustrates the assembled GFCI device of FIG. 16.

As illustrated in FIG. 16, the GFCI enclosure includes a top 40, bottom 45, front 50 and rear 55. Top 40 includes a GFCI PCB 90 mounting section. Bottom section 45 includes a removable bottom section 47, for access to input conductors 290 and for the protective covering of a load input thereto.

It is understood that any configuration housing in combination with any configuration of interface means including any variety of source input conductors and load input conductors may be utilized in the present invention.

Figure 21:
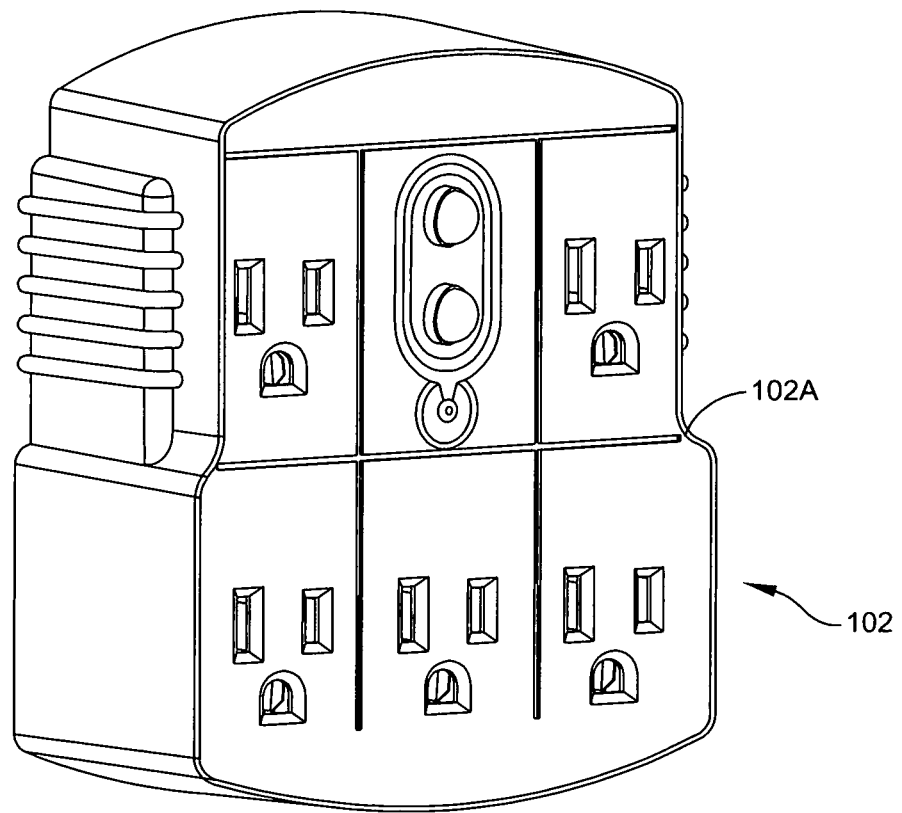
FIG. 21 is a perspective view of a GFCI Enclosure having 5 female receptacle load inputs (for 3 prong load) and 90 degree male receptacle power source input contained in a single enclosure, the enclosure containing the GFCI PCB of FIGS. 11-13.
Figure 22:
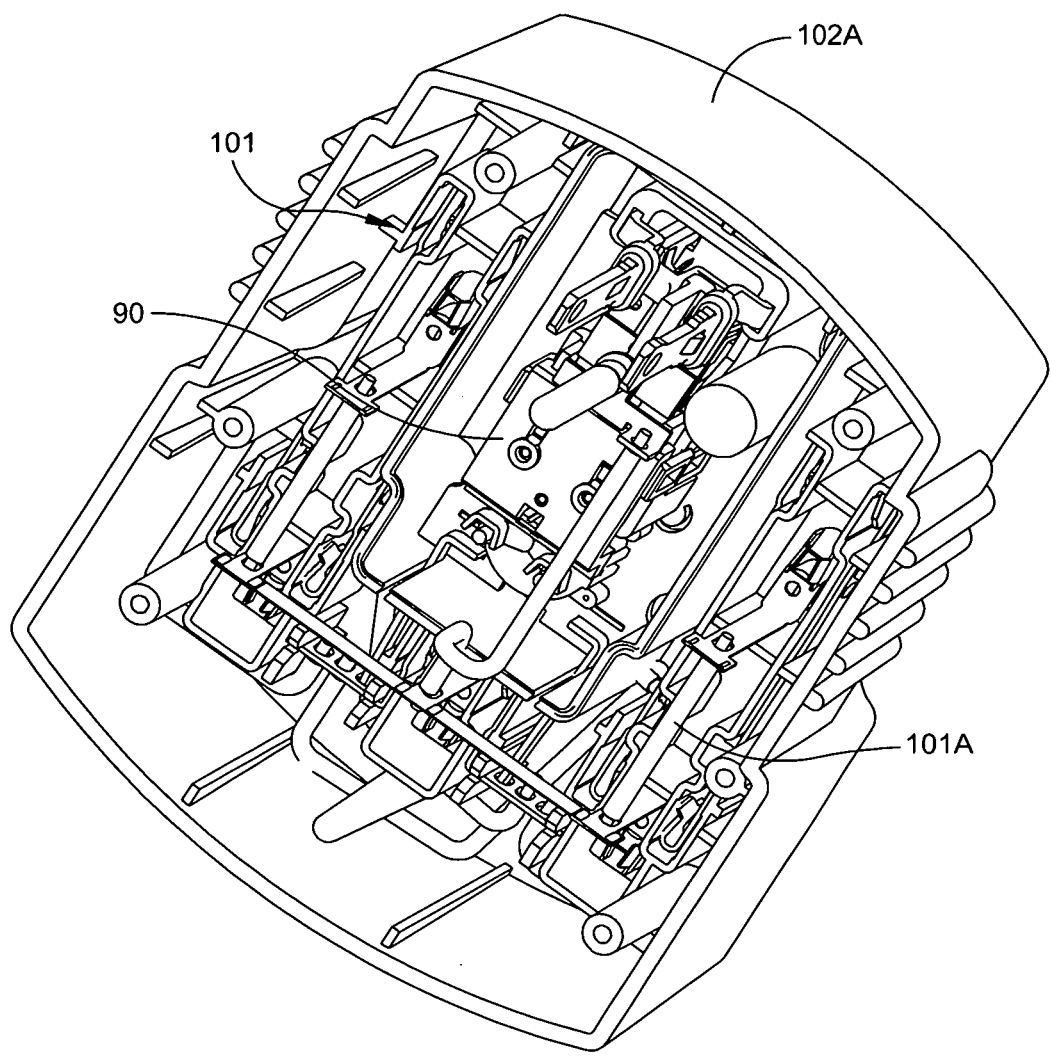
FIGS. 22-25 illustrate the internal components of the GFCI enclosure of FIG. 21.
Figure 23:
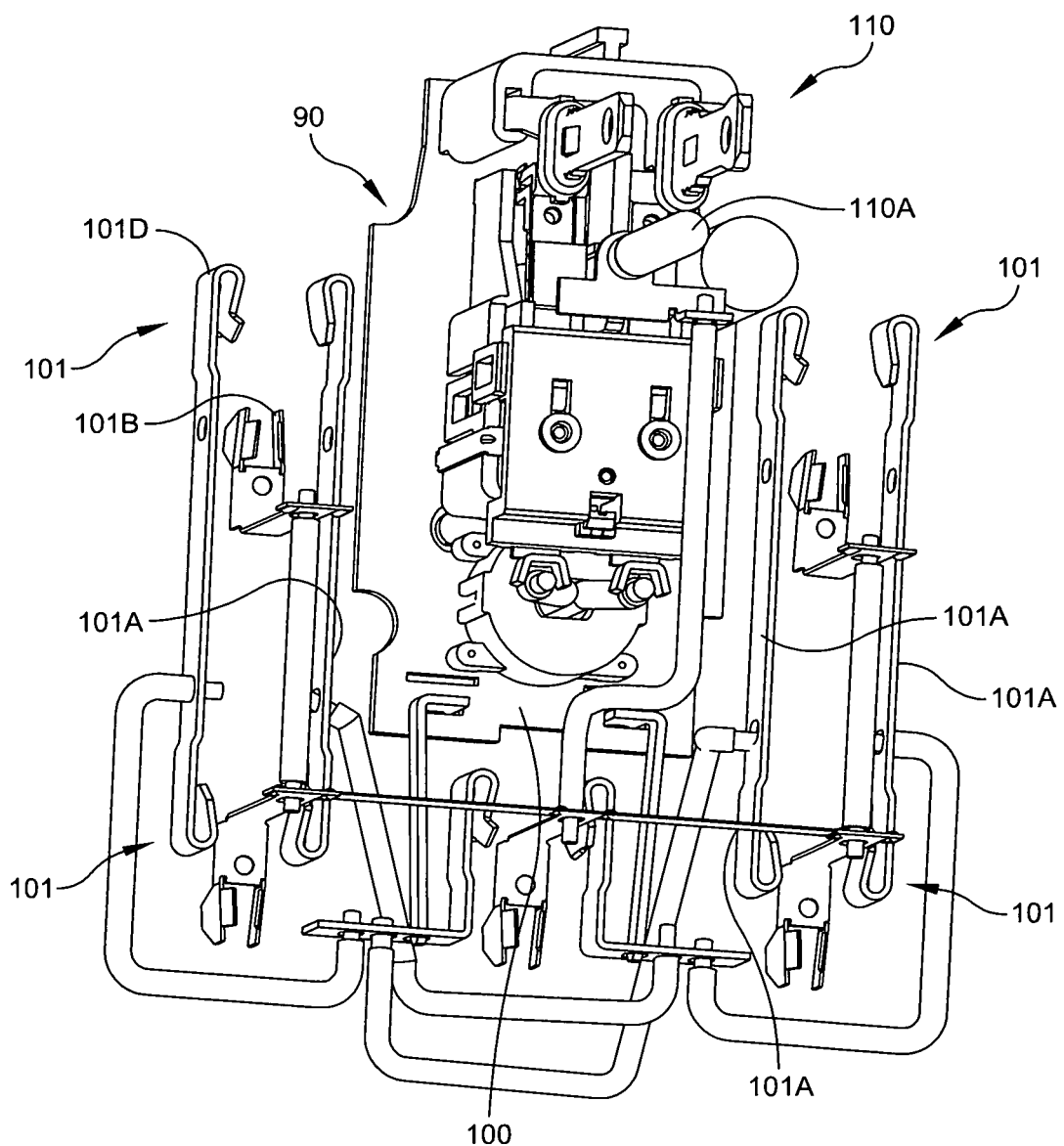
Figure 24:
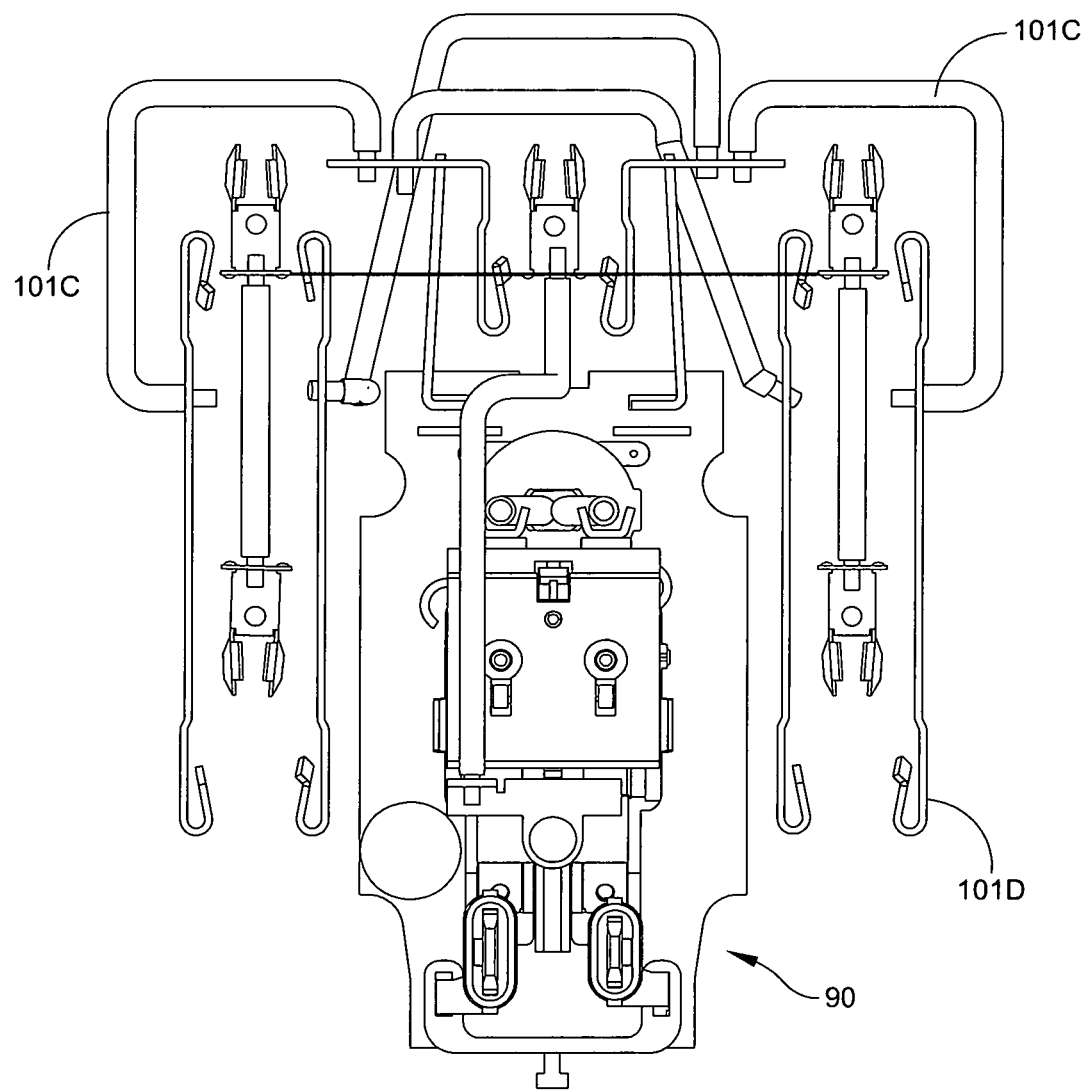
Figure 25:
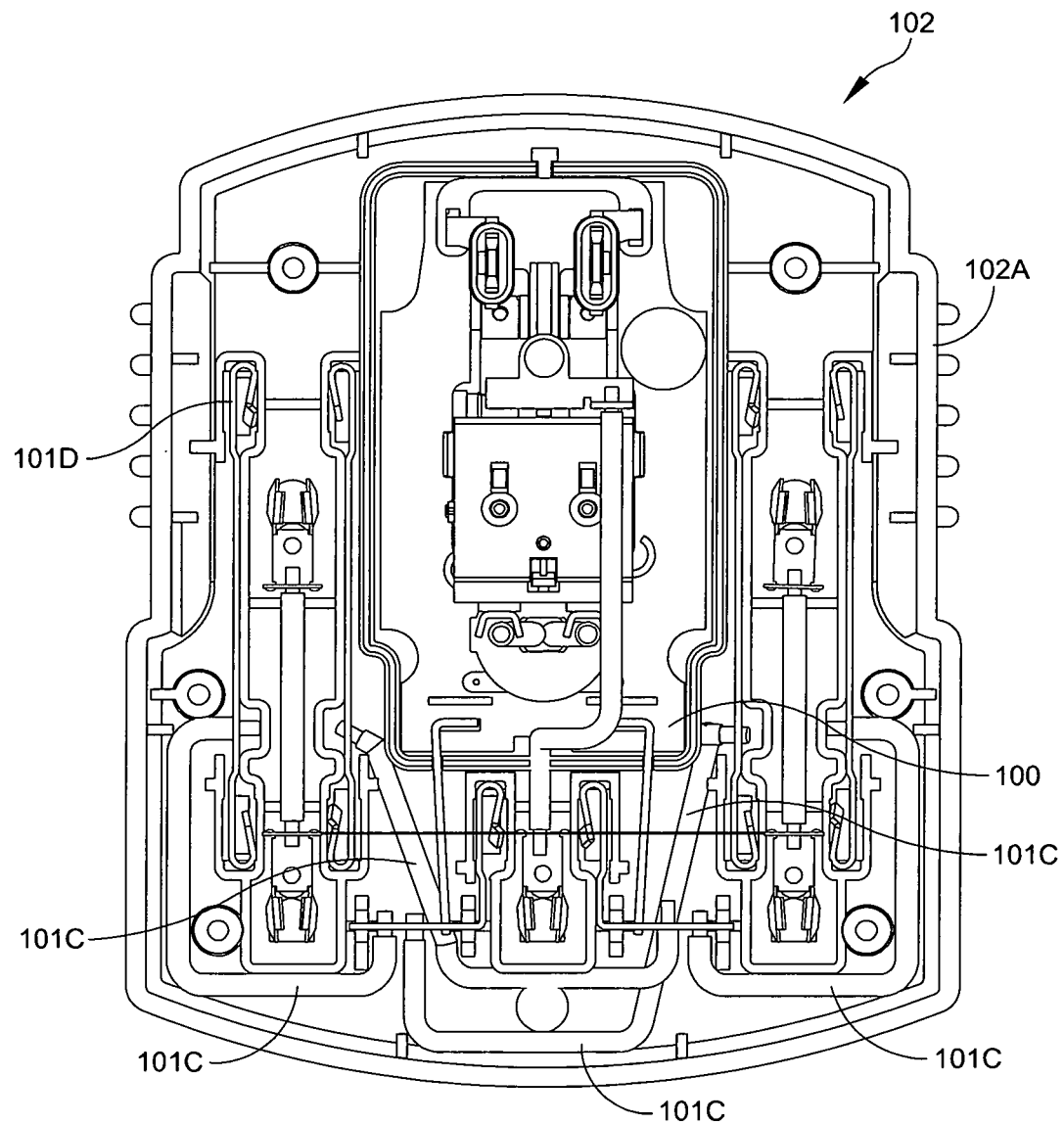
Figure 26:
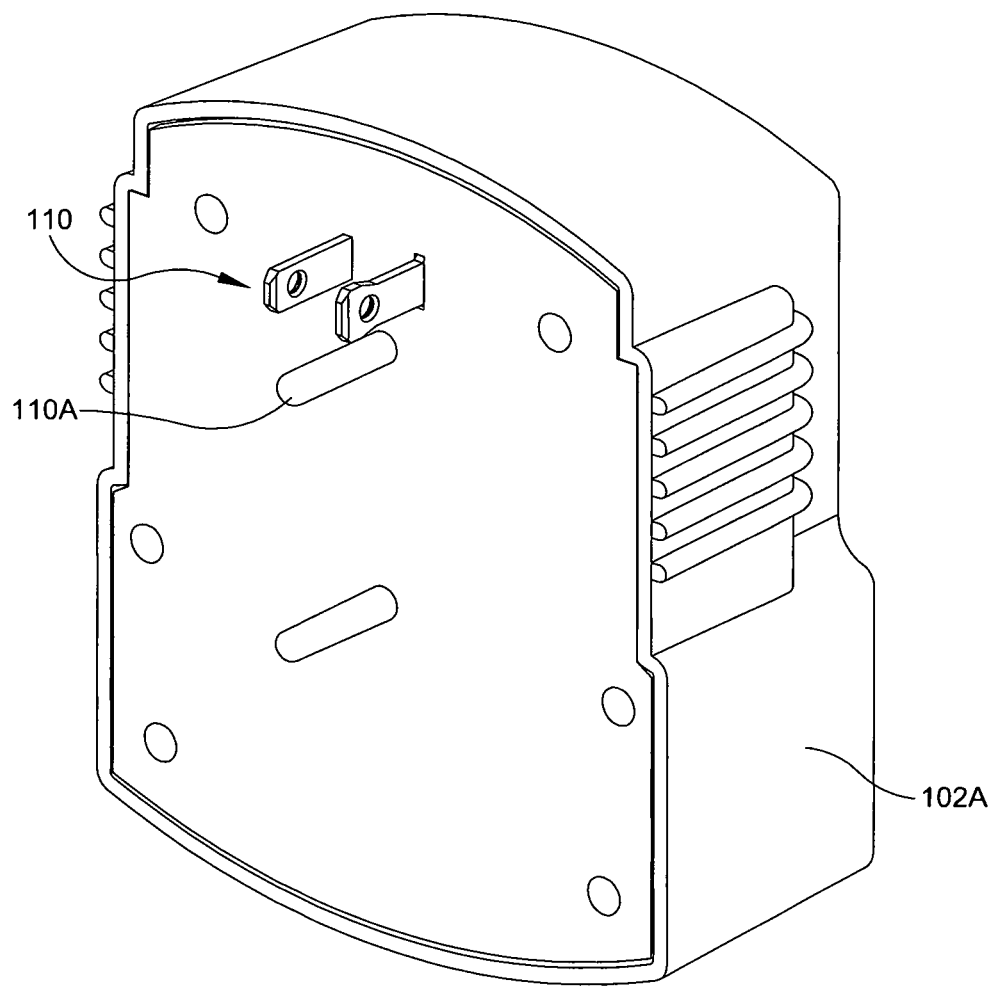
FIG. 26 illustrates the rear perspective view of FIG. 21.

As illustrated in FIG. 21, a GFCI device 102 is illustrated having inputs for a plurality of three prong load assemblies. As illustrated in FIG. 22 through FIG. 25, GFCI PCB 90 includes a plurality of interfaced three prong conductors 101 all connected to load input interface section 100. As illustrated in FIG. 23, the three prong conductors 101 include a plurality of common grounding bars 101A directly connecting the plurality of three prong conductor 101 grounds 101B to source input interface section 110 at ground plug 110A. The plurality of three prong load assemblies 101 and GFCI PCB 90 are integrated into a top housing 102A as illustrated in FIG. 22. As illustrated in FIG. 25, the GFCI device 102 further includes a plurality of load interface bars 101C for the interconnection of the plurality of three prong conductor 101 load inputs 101D to load input interface section 100.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A universal ground fault circuit interrupter (GFCI) device for interrupting the flow of current through a pair of lines extending between a source of power and a load, said GFCI comprising:
   a GFCI circuit board having a top and bottom surfaces and first and second distal ends;
   a GFCI circuit positioned on said top surface of said GFCI circuit board, said GFCI circuit being configured to detect at least one ground fault condition, said GFCI circuit board having at one distal end a load input interface at a second distal end a power source input interface, said GFCI circuit further comprising:
   a load input contact arm, said load input contact arm having a first end, a middle portion and a second end, said first end adaptable for engagement with said load input interface;
   a moveable contact arm having a first end, a middle portion, and a second end, said first end adaptable for engagement with said power source input interface;
   said second end of said load input contact arm and said second end of said moveable contact end in substantial alignment;
   a solenoid having a bottom surface positioned on said top surface of said circuit board, and a top surface;
   said aligned second end of said load input contact arm and said aligned second end of said moveable contact arm positioned above said solenoid top surface;
   said second end of said moveable contact arm adaptable for engagement with said second end of said load input contact arm when said solenoid is energized.

2. A universal ground fault circuit interrupter (GFCI) device for interrupting the flow of current through a pair of lines extending between a source of power and a load, as in claim 1 wherein said solenoid is positioned in the center of said GFCI circuit board.

3. A universal ground fault circuit interrupter (GFCI) device for interrupting the flow of current through a pair of lines extending between a source of power and a load as in claim 1, further including a transformer positioned between said load input interface and said first end of said load input contact arm.

4. A universal ground fault circuit interrupter (GFCI) device for interrupting the flow of current through a pair of lines extending between a source of power and a load as in claim 3, wherein said load input interface extends beyond said second distal end of said GFCI circuit board.

5. A universal ground fault circuit interrupter (GFCI) device for interrupting the flow of current through a pair of lines extending between a source of power and a load as in claim 4, further including:
   a housing having a top cover, a bottom cover, and a wire cover,
   wherein said top cover further comprises a first section and a second section, said GFCI circuit positioned within said first section of said top cover, wherein said first and second distal ends of said GFCI circuit board are contained within said top cover first section, said second section comprising an open cavity and positioned forward of said GFCI circuit board second distal end;
   said first distal end of said GFCI circuit board extending forward of said first end of said moveable contact arm and said second distal end of said GFCI PCB extending forward of said first end of said load input contact arm to create space for said load and power source input to said GFCI circuit.

6. A universal ground fault circuit interrupter (GFCI) device as in claim 5 wherein said
   GFCI Housing is selected from the group consisting of circular, rectangular, spherical, and square housings, said housing further including at least one prong assembly type for supplying power from a source of power to said power source input, said housing further including at least one load assembly for connecting a load to said load input, said load assembly contained in said second section open cavity.

7. A universal ground fault circuit interrupter (GFCI) device for interrupting the flow of current through a pair of lines extending between a source of power and a load, as in claim 1 further including:
   a GFCI circuit board substantially 2.75 inches long by 1.5 inches wide and comprising a plurality of electrical circuit components arranged on said top surface and said bottom surface of said GFCI PCB, said components positioned to minimize space therebetween;
   a plurality of circuit traces, arranged on said bottom surface of said GFCI PCB, said circuit traces positioned to minimize space therebetween while maintaining arcing and dielectric prevention distances.

8. A universal ground fault circuit interrupter (GFCI) device for interrupting the flow of current through a pair of lines extending between a source of power and a load as in claim 1, wherein said solenoid further includes a laterally positioned plunger and an actuator, said plunger for rotation of said actuator from a first position to a second position,
   said second position of said actuator causing the engagement of said second end of said load input contact arm and said second end of said moveable contact arm when said solenoid is energized, and
   said first position of said actuator disengaging said second end of said load input contact arm and said second end of said moveable contact arm, when said solenoid is de-energized.

9. A universal ground fault circuit interrupter (GFCI) device for interrupting the flow of current through a pair of lines extending between a source of power and a load as in claim 8, wherein said actuator includes a first and second end, said first end engaged by said plunger and said second end in engagement with said middle portion of said moveable contact arm.

10. A universal ground fault circuit interrupter (GFCI) device for interrupting the flow of current through a pair of lines extending between a source of power and a load as in claim 9, wherein said actuator extends vertically from said first end to said second end.

11. A universal ground fault circuit interrupter (GFCI) device for interrupting the flow of current through a pair of lines extending between a source of power and a load as in claim 9, wherein said actuator second end has a sloped top surface.

12. A universal ground fault circuit interrupter (GFCI) device for interrupting the flow of current through a pair of lines extending between a source of power and a load as in claim 1, wherein said moveable contact arm is substantially parallel to said solenoid top surface.

13. A universal ground fault circuit interrupter (GFCI) device for interrupting the flow of current through a pair of lines extending between a source of power and a load as in claim 1, wherein said second end of said load input contact arm is positioned above said second end of said moveable contact arm.

14. A universal ground fault circuit interrupter (GFCI) device as in claim 1, wherein said GFCI Circuit further includes:
   (a) a circuit breaker having a switch located in one of said lines, said switch having a first position in which the source of power in its associated line is not connected to the load and a second position in which the source of power in its associated line is connected to the load;
   (b) a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state;
   (c) a booster circuit for selectively supplying a first voltage to the solenoid sufficient to cause said solenoid to switch from its de-energized state to its energized state, said first voltage being supplied to said solenoid through said switch when said switch is in its first position;
   (d) a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state;
   (e) a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state; and
   (f) a fault detecting circuit for detecting the presence of a fault condition in at least one of said lines extending between the power and the load and for causing said latch circuit to latch in its second bi-stable state upon detection of said fault condition.

* * * * *